United States Patent
Suwa et al.

(10) Patent No.: US 8,513,363 B2
(45) Date of Patent: Aug. 20, 2013

(54) ADHESIVE COMPOSITION

(75) Inventors: Tatsuhiro Suwa, Kanagawa (JP); Hiroshi Ogawa, Kanagawa (JP)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/282,662

(22) Filed: Oct. 27, 2011

(65) Prior Publication Data
US 2012/0108733 A1 May 3, 2012

(30) Foreign Application Priority Data

Oct. 29, 2010 (JP) ................................ 2010-244403
Jun. 3, 2011 (KR) ........................ 10-2011-0054207

(51) Int. Cl.
C09J 133/14 (2006.01)
C09J 133/24 (2006.01)

(52) U.S. Cl.
USPC .................... 525/329.9; 524/555; 524/558

(58) Field of Classification Search
USPC ...... 525/192, 203, 204, 205, 329.9; 524/555, 524/558
See application file for complete search history.

(56) References Cited

U.S. PATENT DOCUMENTS

| | | | |
|---|---|---|---|
| 2002/0146559 A1* | 10/2002 | Touhsaent | 428/341 |
| 2006/0069200 A1* | 3/2006 | Kondo et al. | 524/502 |
| 2008/0166485 A1* | 7/2008 | Steenwinkel et al. | 427/385.5 |
| 2010/0209703 A1* | 8/2010 | Takarada et al. | 428/355 AC |

FOREIGN PATENT DOCUMENTS

| | | |
|---|---|---|
| JP | 58-013623 A | 1/1983 |
| JP | 11-293222 A | 10/1999 |
| JP | 2007-211091 A | 8/2007 |

* cited by examiner

Primary Examiner — Ling Choi
Assistant Examiner — Chun-Cheng Wang
(74) Attorney, Agent, or Firm — Lee & Morse, P.C.

(57) ABSTRACT

An adhesive composition, an optical member, a surface protective film, and an adhesive sheet, the adhesive composition including 100 parts by weight of a (meth)acrylic copolymer having a weight average molecular weight of about 100,000 to about 2,000,000 g/mol; about 0.05 to about 5 parts by weight of a carbodiimide crosslinker, based on 100 parts by weight of the (meth)acrylic copolymer; and about 0.001 to about 5 parts by weight of an imidazole compound represented by Formula 1, based on 100 parts by weight of the (meth)acrylic copolymer:

[Formula 1]

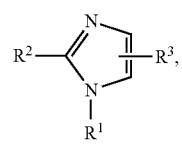

wherein, in Formula 1, $R^1$, $R^2$, and $R^3$ are each independently a hydrogen atom, a halogen atom, or a substituted or unsubstituted C1 to C10 straight or branched alkyl group.

20 Claims, 9 Drawing Sheets

FIG. 1: Table 2

| Composition of polymer (A) | | Preparation example | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Sample | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 | A-19 |
| Monomer (parts by weight) | BA | 99 | 89.9 | 99.2 | 98.2 | 98 | 95.8 | 87 | 88 | 83.7 | 93.3 | 80 | 99 | 88.7 | 85 | 91 | 90 | 80 | 73 | 95 |
| | MA | - | 10 | - | - | - | 3 | 4 | 7 | 15 | 5 | 16.8 | - | 10 | - | - | 9.2 | 18.4 | 25.8 | 3 |
| | HEA | 1 | - | - | - | - | - | - | - | 1 | - | 2.5 | - | - | - | - | - | 1.5 | - | - |
| | 4HBA | - | 0.1 | - | 1.8 | - | 0.2 | - | - | - | - | - | - | - | - | - | - | - | 0.2 | - |
| | HEAA | - | - | 0.8 | - | - | - | - | - | - | 1 | - | - | - | - | - | 0.8 | - | - | - |
| | AA | - | - | - | - | 2 | 1 | 9 | 5 | 0.3 | 0.7 | 0.7 | 1 | 0.3 | 15 | 9 | - | 0.1 | 1 | 2 |
| Total (parts by weight) | | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 4500 | 5000 | 4500 | 4000 | 4500 | 4500 | 3500 | 3500 | 3500 | 4000 | 7000 | 5000 | 3500 | 5000 | 6000 | 3500 | 6000 | 4500 | 5000 |
| Solid content (%) | | 20 | 20 | 20 | 20 | 20 | 20 | 20 | 20 | 20 | 20 | 20 | 20 | 20 | 20 | 20 | 20 | 20 | 20 | 20 |
| Weight average molecular weight of polymer (A) in millions g/mol | | 1.6 | 1.6 | 1.6 | 1.4 | 1.6 | 1.4 | 1.2 | 1.2 | 1.2 | 1.4 | 1.7 | 1.8 | 1.3 | 1.5 | 1.7 | 1.2 | 1.6 | 1.4 | 1.5 |

FIG. 2: Table 4

| Composition (parts by weight) | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Polymer (A) | | A-1 | 100 | | | | | | | | | |
| | | A-2 | | 100 | | | | | | | | |
| | | A-3 | | | 100 | | | | | | | |
| | | A-4 | | | | 100 | | | | | | |
| | | A-5 | | | | | 100 | | | | | |
| | | A-6 | | | | | | 100 | | | | |
| | | A-7 | | | | | | | 100 | | | |
| | | A-8 | | | | | | | | 100 | | |
| | | A-9 | | | | | | | | | 100 | |
| | | A-10 | | | | | | | | | | 100 |
| Carbodiimide crosslinker (B) | B-1 | | 1 | 0.05 | - | 4 | - | - | - | - | 3 | - |
| | B-2 | | - | - | - | - | 0.1 | - | 5 | 1 | - | - |
| | B-3 | | - | - | 0.1 | - | - | 0.2 | - | - | - | 0.3 |
| Imidazole compound (C) | C-1 | | 0.01 | - | - | 0.05 | - | - | 0.1 | - | - | - |
| | C-2 | | - | 0.02 | - | - | - | - | - | - | 0.04 | - |
| | C-3 | | - | - | - | - | 0.05 | 0.02 | - | - | - | 0.07 |
| | C-4 | | - | - | 0.03 | - | - | 0.15 | - | 0.05 | - | - |
| Isocyanate crosslinker (D) | D-1 | | 0.1 | 1 | 0.2 | - | 0.5 | - | - | 0.5 | - | 1 |
| Silane coupling agent (E) | E-1 | | 0.1 | - | 0.2 | - | 0.3 | 0.1 | 0.1 | 0.1 | 0.3 | 0.1 |
| | E-2 | | - | 0.1 | - | 0.2 | - | - | - | - | - | - |
| Additional crosslinker (F) | F-1 | | - | - | - | - | - | - | - | - | - | - |
| Concentration of adhesive composition (wt%) | | | 17 | 17 | 17 | 17 | 17 | 17 | 17 | 17 | 17 | 17 |
| Viscosity of adhesive composition (mPa·s) | Immediately after preparation | | 4,000 | 4,500 | 4,000 | 3,500 | 4,000 | 4,000 | 3,000 | 3,000 | 3,000 | 3,500 |
| | After 12 hours | | 4,000 | 4,500 | 4,100 | 3,500 | 3,900 | 4,000 | 3,100 | 2,900 | 3,000 | 3,500 |
| Gel fraction of adhesive composition (%) | After 0.5 days | | 76 | 82 | 83 | 82 | 76 | 86 | 87 | 88 | 84 | 80 |
| | After 7 days | | 77 | 80 | 85 | 83 | 78 | 84 | 88 | 88 | 82 | 81 |
| Properties | Metal corrosion control and prevention properties | | O | O | O | O | O | O | O | O | O | O |
| | Light leakage resistance | | ⊚ | ⊚ | ⊚ | O | ⊚ | ⊚ | O | ⊚ | O | ⊚ |
| | Durability | | O | O | O | O | O | O | O | O | O | O |
| | Adhesive strength | | 3 | 5 | 3 | 6 | 3 | 4 | 3 | 3 | 4 | 3 |
| | Adhesion to substrate | | O | O | O | O | O | O | O | O | O | O |
| | Adherend contamination resistance | | O | O | O | O | O | O | O | O | O | O |
| | Low-temperature stability | | O | O | O | O | O | O | O | O | O | O |
| | Reworkability | | O | O | O | O | O | O | O | O | O | O |

FIG. 3: Table 5

| Composition (parts by weight) | | Comparative Example | | | | | | | | |
|---|---|---|---|---|---|---|---|---|---|---|
| | | 1 | 2 | 3 | 4 | 5 | 6 | 7 | 8 | 9 |
| Polymer (A) | | A-11 | A-12 | A-13 | A-14 | A-15 | A-16 | A-17 | A-18 | A-19 |
| | | 100 | 100 | 100 | 100 | 100 | 100 | 100 | 100 | 100 |
| Carbodiimide crosslinker (B) | B-1 | 0.3 | - | - | - | - | - | 6.0 | - | - |
| | B-2 | - | 0.1 | - | - | - | - | - | 1.0 | - |
| | B-3 | - | - | - | - | - | 0.01 | - | - | 0.2 |
| Imidazole compound (C) | C-1 | - | - | - | - | - | - | 0.03 | - | - |
| | C-2 | - | - | - | - | - | - | - | - | 0.001 |
| | C-3 | - | - | 0.04 | - | - | 0.05 | - | - | - |
| | C-4 | - | - | - | - | - | - | - | 0.5 | - |
| Isocyanate crosslinker (D) | D-1 | - | 0.5 | 0.2 | - | 0.5 | 0.4 | - | - | - |
| Silane coupling agent (E) | E-1 | - | 0.1 | 0.2 | - | - | 0.1 | 0.1 | 0.1 | - |
| | E-2 | 0.2 | - | - | - | - | - | - | - | 0.2 |
| | E-3 | - | - | - | 0.1 | - | - | - | - | - |
| | E-4 | - | - | - | - | 0.1 | - | - | - | - |
| Additional crosslinker (F) | F-1 | - | - | - | 0.5 | - | - | - | - | - |
| Concentration of adhesive composition (wt%) | | 17 | 17 | 17 | 17 | 17 | 17 | 17 | 17 | 17 |
| Viscosity of adhesive composition (mPa·s) | Immediately after preparation | 6,500 | 4,500 | 3,000 | 4,500 | 5,500 | 3,000 | 5,500 | 4,000 | 4,500 |
| | After 12 hours | 7,000 | 4,500 | 2,900 | 4,400 | 5,600 | 3,000 | 5,500 | 4,700 | 4,500 |
| Gel fraction of adhesive composition (%) | After 0.5 days | 8 | 10 | 2 | 25 | 4 | 7 | 70 | 81 | 15 |
| | After 7 days | 75 | 79 | 78 | 92 | 80 | 77 | 74 | 80 | 76 |
| Properties | Metal corrosion control and prevention properties | O | O | O | O | O | O | O | O | O |
| | Light leakage resistance | X | X | X | X | X | X | X | X | X |
| | Durability | X | X | X | X | X | X | X | X | X |
| | Adhesive strength | 34 | 30 | 28 | 23 | 32 | 26 | 5 | 10 | 17 |
| | Adhesion to substrate | X | X | X | X | X | X | O | X | X |
| | Adherend contamination resistance | X | X | X | X | X | X | O | X | X |
| | Low-temperature stability | X | X | X | X | X | X | O | X | X |
| | Reworkability | X | X | X | X | X | X | O | X | X |

FIG. 4: Table 6

| Composition of polymer (A) | | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|---|
| Sample | | A-20 | A-21 | A-22 | A-23 | A-24 | A-25 | A-26 | A-27 | A-28 | A-29 | A-30 | A-31 | A-32 | A-33 | A-34 | A-35 | A-36 | A-37 | A-38 | A-39 |
| Monomer (parts by weight) | BA | 40 | - | 10.8 | 10 | 5 | 2 | 20 | - | 8 | 5 | 80 | 10 | 40 | - | - | 2 | 60 | 15 | 16 | 8.5 |
| | 2EHA | 59 | 98 | 80 | 89 | 92 | 91.9 | 78 | 98 | 90 | 92.5 | 14.3 | 89 | 58.5 | 99.0 | 93.8 | 97 | 35.8 | 82 | 80 | 90 |
| | HEA | 1 | - | - | - | 3 | - | - | - | 1 | - | 5 | - | 1 | 1 | 6 | - | 4 | - | - | - |
| | 4HBA | - | - | - | 1 | - | 6 | - | 2 | - | 1 | - | 1 | - | - | - | - | - | 3 | - | - |
| | HEAA | - | 2 | 9 | - | - | - | 2 | - | 1 | - | - | - | - | - | - | 1 | - | - | 4 | 0.5 |
| | AM | - | - | - | - | - | - | - | - | - | - | - | - | - | - | - | - | - | - | - | - |
| | AA | - | - | 0.2 | - | - | 0.1 | - | - | - | 0.5 | 0.7 | - | 0.5 | - | 0.2 | - | 0.2 | - | - | 1 |
| Total (parts by weight) | | 100 | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 3500 | 1500 | 1000 | 1500 | 2000 | 1000 | 2500 | 1500 | 1500 | 1500 | 5000 | 3500 | 4000 | 2000 | 3000 | 2800 | 4000 | 3500 | 3000 | 3000 |
| Solid content (%) | | 35 | 35 | 35 | 35 | 35 | 35 | 35 | 35 | 35 | 35 | 35 | 35 | 35 | 35 | 35 | 35 | 35 | 35 | 35 | 35 |
| Weight average molecular weight of polymer (A) in millions g/mol | | 0.8 | 0.3 | 0.5 | 0.4 | 0.4 | 0.4 | 0.5 | 0.3 | 0.3 | 0.4 | 0.9 | 0.6 | 0.8 | 0.3 | 0.M | 0.4 | 0.9 | 0.5 | 0.5 | 0.5 |

Preparation example

FIG. 5: Table 8

| Composition (parts by weight) | | | Example | | | | | | | | |
|---|---|---|---|---|---|---|---|---|---|---|---|
| | | | 11 | 12 | 13 | 14 | 15 | 16 | 17 | 18 | 19 | 20 |
| Polymer (A) | | | A-20 | A-21 | A-22 | A-23 | A-24 | A-25 | A-26 | A-27 | A-28 | A-29 |
| | | | 100 | 100 | 100 | 100 | 100 | 100 | 100 | 100 | 100 | 100 |
| Carbodiimide crosslinker (B) | B-1 | | 0.5 | 0.7 | 3 | 0.8 | - | 0.1 | - | 5 | - | 1 |
| | B-3 | | - | - | - | - | 4 | - | 1 | - | 0.2 | - |
| Imidazole compound (C) | C-1 | | 0.01 | - | - | 0.05 | - | - | 0.1 | - | - | - |
| | C-2 | | - | 0.02 | - | - | - | - | - | - | 0.04 | - |
| | C-3 | | - | - | - | - | 0.05 | 0.02 | - | - | - | 0.07 |
| | C-4 | | - | - | 0.03 | - | - | - | - | 0.05 | - | - |
| Isocyanate crosslinker (D) | D-2 | | 0.5 | 0.8 | - | 0.2 | 2 | - | - | - | - | - |
| Concentration of adhesive composition (wt%) | | | 32 | 32 | 32 | 32 | 32 | 32 | 32 | 32 | 32 | 32 |
| Viscosity of adhesive composition (mPa·s) | Immediately after preparation | | 3,000 | 1,000 | 500 | 1,000 | 1,500 | 500 | 2,000 | 1,000 | 1,000 | 1,000 |
| | After 12 hours | | 3,100 | 1,300 | 500 | 1,000 | 1,900 | 500 | 2,200 | 1,000 | 900 | 1,100 |
| Gel fraction of adhesive composition (%) | After 0.5 days | | 92 | 93 | 96 | 96 | 97 | 94 | 94 | 96 | 95 | 96 |
| | After 7 days | | 94 | 95 | 98 | 96 | 97 | 93 | 95 | 96 | 94 | 97 |
| Properties | Metal corrosion control and prevention properties | | ○ | ○ | ○ | ○ | ○ | ○ | ○ | ○ | ○ | ○ |
| | Adhesive strength | | 0.10 | 0.11 | 0.12 | 0.12 | 0.13 | 0.16 | 0.15 | 0.10 | 0.15 | 0.13 |
| | Adhesion to substrate | | ○ | ○ | ○ | ○ | ○ | ○ | ○ | ○ | ○ | ○ |
| | Adherend contamination resistance | | ○ | ○ | ○ | ○ | ○ | ○ | ○ | ○ | ○ | ○ |
| | Low-temperature stability | | ○ | ○ | ○ | ○ | ○ | ○ | ○ | ○ | ○ | ○ |
| | Transparency of adhesive layer | | ○ | ○ | ○ | ○ | ○ | ○ | ○ | ○ | ○ | ○ |
| | Autoclaving suitability | | ○ | ○ | ○ | ○ | ○ | ○ | ○ | ○ | ○ | ○ |

FIG. 6: Table 9

| Composition (parts by weight) | | | Comparative Example | | | | | | | | | |
|---|---|---|---|---|---|---|---|---|---|---|---|---|
| | | | 10 | 11 | 12 | 13 | 14 | 15 | 16 | 17 | 18 | 19 |
| Polymer (A) | | A-30 | A-31 | A-32 | A-33 | A-34 | A-35 | A-36 | A-37 | A-38 | A-39 |
| | | | 100 | 100 | 100 | 100 | 100 | 100 | 100 | 100 | 100 | 100 |
| Carbodiimide crosslinker (B) | B-1 | 2.5 | 1 | - | 0.03 | - | - | - | - | 0.3 | 0.3 | - |
| | B-3 | - | - | - | - | - | - | - | - | - | - | - |
| Imidazole compound (C) | C-1 | - | - | - | - | - | - | - | - | 0.5 | - | - |
| | C-2 | - | - | - | 0.03 | - | - | - | - | - | - | - |
| | C-3 | - | - | 0.04 | - | - | 0.05 | - | - | - | - | 0.02 |
| | C-4 | - | - | - | - | - | - | - | - | - | - | - |
| Isocyanate crosslinker (D) | D-2 | - | 1 | 2 | - | 1 | 0.4 | - | - | - | 0.005 | - |
| | D-3 | - | - | - | - | 0.5 | - | 5 | - | - | - | - |
| Other additives (G) | G-1 | - | - | - | - | - | - | - | - | - | - | - |
| | G-2 | - | - | - | - | - | - | 0.015 | - | - | - | - |
| | G-3 | - | - | - | - | - | - | 2 | - | - | - | - |
| | G-4 | - | - | - | - | - | - | - | - | - | - | 0.2 |
| Concentration of adhesive composition (wt%) | | 32 | 32 | 32 | 32 | 32 | 32 | 32 | 32 | 32 | 32 |
| Viscosity of adhesive composition (mPa·s) | Immediately after preparation | 4,500 | 3,000 | 3,500 | 1,500 | 2,500 | 2,300 | 3,500 | 3,000 | 2,500 | 2,500 |
| | After 12 hours | 8,000 | 4,100 | 6,000 | 1,500 | 4,000 | 2,300 | Gelated | 3,000 | 2,500 | 2,500 |
| Gel fraction of adhesive composition (%) | After 0.5 days | 32 | 55 | 0 | 1 | 60 | 96 | 63 | 96 | 45 | 10 |
| | After 7 days | 96 | 97 | 95 | 30 | 96 | 96 | 95 | 96 | 93 | 90 |
| Properties | Metal corrosion control and prevention properties | ○ | ○ | ○ | ○ | ○ | ○ | ○ | ○ | ○ | ○ |
| | Adhesive strength | 5 | 3 | 12 | 10 | 2 | 0.08 | 2 | 0.12 | 3 | 15 |
| | Adhesion to substrate | X | X | X | X | X | ○ | X | X | X | X |
| | Adherend contamination resistance | X | X | ○ | X | X | X | X | ○ | X | X |
| | Low-temperature stability | X | ○ | ○ | ○ | X | X | X | ○ | X | X |
| | Transparency of adhesive layer | ○ | ○ | ○ | ○ | ○ | X | ○ | X | ○ | ○ |
| | Autoclaving suitability | X | X | X | X | X | ○ | X | ○ | X | X |

FIG. 7: Table 10

| Composition of polymer (A) | | Preparation example | | | | | | | | | | | | | | | | | | | |
|---|---|---|---|---|---|---|---|---|---|---|---|---|---|---|---|---|---|---|---|---|
| Sample | | 40 | 41 | 42 | 43 | 44 | 45 | 46 | 47 | 48 | 49 | 50 | 51 | 52 | 53 | 54 | 55 | 56 | 57 | 58 | 59 |
| | | A-40 | A-41 | A-42 | A-43 | A-44 | A-45 | A-46 | A-47 | A-48 | A-49 | A-50 | A-51 | A-52 | A-53 | A-54 | A-55 | A-56 | A-57 | A-58 | A-59 |
| Monomer (parts by weight) | BA | 40 | - | 10.8 | 60 | 50 | 2 | 20 | 80 | 60.8 | 5 | 88 | 10 | 40 | 30 | - | 2 | 60 | 15 | 16 | 40 |
| | 2EHA | 59 | 98 | 80 | 30.5 | 46.5 | 89 | 78 | 18 | 38 | 92.5 | 6 | 89 | 58.5 | 66.2 | 93.8 | 97 | 35.8 | 82 | 80 | 53.5 |
| | VAc | - | - | - | 2.5 | - | - | - | - | - | - | 2.5 | - | - | - | - | - | - | - | - | - |
| | HEA | 1 | - | - | - | 3 | - | - | - | 0.2 | - | 3 | - | 1 | 0.8 | 6 | - | 4 | - | - | - |
| | 4HBA | - | - | - | - | - | 6 | - | 2 | - | 1 | - | 1 | - | - | - | - | - | 3 | - | - |
| | HEAA | - | - | 9 | - | - | - | 2 | - | - | 1 | - | - | - | - | - | 1 | - | - | 4 | 0.5 |
| | AM | - | - | - | - | 0.5 | - | - | - | - | 0.5 | 0.5 | - | 0.5 | - | 0.2 | - | 0.2 | - | - | - |
| | AA | - | 2 | 0.2 | 7 | - | 3 | - | - | 1 | - | - | - | - | 3 | - | - | - | - | - | 6 |
| Total (parts by weight) | | 100 | 100 | 100 | 100 | 100 | 100 | 100 | 100 | 100 | 100 | 100 | 100 | 100 | 100 | 100 | 100 | 100 | 100 | 100 | 100 |
| Viscosity (mPa·s) | | 3500 | 1500 | 1000 | 4000 | 4500 | 1000 | 2500 | 6500 | 4000 | 1500 | 6000 | 3500 | 4000 | 3500 | 3000 | 2800 | 4000 | 3500 | 3000 | 3000 |
| Solid content (%) | | 35 | 35 | 35 | 35 | 35 | 35 | 35 | 35 | 35 | 35 | 35 | 35 | 35 | 35 | 35 | 35 | 35 | 35 | 35 | 35 |
| Weight average molecular weight of polymer (A) in millions g/mol | | 0.8 | 0.3 | 0.5 | 0.75 | 0.85 | 0.35 | 0.5 | 0.9 | 0.7 | 0.4 | 0.9 | 0.6 | 0.8 | 0.7 | 0.4 | 0.4 | 0.9 | 0.5 | 0.5 | 0.7 |

FIG. 8: Table 12

| Composition (part by weight) | | 21 | 22 | 23 | 24 | 25 | 26 | 27 | 28 | 29 | 30 |
|---|---|---|---|---|---|---|---|---|---|---|---|
| Polymer (A) | | A-40 | A-41 | A-42 | A-43 | A-44 | A-45 | A-46 | A-47 | A-48 | A-49 |
| | | 100 | 100 | 100 | 100 | 100 | 100 | 100 | 100 | 100 | 100 |
| Carbodiimide crosslinker (B) | B-1 | 0.3 | 0.7 | 3 | - | - | 0.1 | - | 0.5 | - | 1 |
| | B-2 | - | - | - | 0.4 | - | - | - | - | - | - |
| | B-3 | - | - | - | - | 2 | - | 1 | - | 0.2 | - |
| Imidazole compound (C) | C-1 | 0.01 | - | - | 0.05 | - | - | 0.1 | - | - | - |
| | C-2 | - | 0.02 | - | - | - | - | - | - | 0.04 | - |
| | C-3 | - | - | 0.03 | - | 0.05 | 0.02 | - | 0.05 | - | 0.07 |
| | C-4 | - | - | - | - | - | - | - | - | - | - |
| Isocyanate crosslinker (D) | D-2 | 0.2 | 0.8 | - | 0.2 | 1 | - | - | - | - | - |
| Concentration of adhesive composition (wt%) | | 32 | 32 | 32 | 32 | 32 | 32 | 32 | 32 | 32 | 32 |
| Viscosity of adhesive composition (mPa·s) | Immediately after preparation | 3,000 | 1,000 | 500 | 3,500 | 4,000 | 500 | 2,000 | 6,000 | 4,000 | 1,000 |
| | After 12 hours | 3,200 | 1,300 | 500 | 3,700 | 4,600 | 600 | 2,100 | 6,300 | 4,100 | 1,100 |
| Gel fraction of adhesive composition (%) | After 0.5 days | 90 | 93 | 96 | 89 | 97 | 94 | 94 | 88 | 87 | 96 |
| | After 7 days | 92 | 95 | 98 | 92 | 97 | 95 | 95 | 90 | 89 | 97 |
| Properties | Metal corrosion control and prevention properties | ○ | ○ | ○ | ○ | ○ | ○ | ○ | ○ | ○ | ○ |
| | Adhesive strength | 1 | 0.15 | 0.17 | 5 | 0.30 | 0.20 | 0.15 | 10 | 3 | 0.10 |
| | Adhesion to substrate | ○ | ○ | ○ | ○ | ○ | ○ | ○ | ○ | ○ | ○ |
| | Adherend contamination resistance | ○ | ○ | ○ | ○ | ○ | ○ | ○ | ○ | ○ | ○ |
| | Low-temperature stability | ○ | ○ | ○ | ○ | ○ | ○ | ○ | ○ | ○ | ○ |
| | Transparency of adhesive layer | ○ | ○ | ○ | ○ | ○ | ○ | ○ | ○ | ○ | ○ |
| | Heat resistance | ○ | ○ | ○ | ○ | ○ | ○ | ○ | ○ | ○ | ○ |
| | Humidity/heat resistance | ○ | ○ | ○ | ○ | ○ | ○ | ○ | ○ | ○ | ○ |

FIG. 9: Table 13

| Composition (parts by weight) | | | Comparative Example | | | | | | | | | |
|---|---|---|---|---|---|---|---|---|---|---|---|---|
| | | | 20 | 21 | 22 | 23 | 24 | 25 | 26 | 27 | 28 | 29 |
| Polymer (A) | | | A-50 | A-51 | A-52 | A-53 | A-54 | A-55 | A-56 | A-57 | A-58 | A-59 |
| | | | 100 | 100 | 100 | 100 | 100 | 100 | 100 | 100 | 100 | 100 |
| Carbodiimide crosslinker (B) | | B-1 | 0.3 | 1 | - | - | - | - | - | 0.3 | 0.3 | - |
| | | B-2 | - | - | - | 0.03 | - | - | - | - | - | - |
| | | B-3 | - | - | - | - | - | 7 | - | - | - | - |
| Imidazole compound (C) | | C-1 | - | - | - | - | - | - | - | 0.5 | - | 0.02 |
| | | C-2 | - | - | 0.04 | 0.03 | - | - | - | - | - | - |
| | | C-3 | - | - | - | - | - | 0.05 | - | - | - | - |
| | | C-4 | - | - | - | - | - | - | - | - | 0.005 | - |
| Isocyanate crosslinker (D) | | D-2 | - | 1 | 2 | - | 1 | 0.4 | - | - | - | - |
| | | D-3 | - | - | - | - | - | - | 5 | - | - | - |
| Other additives (G) | | G-1 | - | - | - | - | 0.5 | - | - | - | - | - |
| | | G-2 | - | - | - | - | - | - | 0.015 | - | - | - |
| | | G-3 | - | - | - | - | - | - | 2 | - | - | - |
| | | G-4 | - | - | - | - | - | - | - | - | - | 0.2 |
| Concentration of adhesive composition (wt%) | | | 32 | 32 | 32 | 32 | 32 | 32 | 32 | 32 | 32 | 32 |
| Viscosity of adhesive composition (mPa·s) | Immediately after preparation | | 5,500 | 3,000 | 3,500 | 3,000 | 2,500 | 2,300 | 3,500 | 3,000 | 2,500 | 3,000 |
| | After 12 hours | | 5,800 | 4,100 | 6,000 | 3,100 | 4,000 | 2,300 | Gelated | 3,000 | 2,500 | 3,100 |
| Gel fraction of adhesive composition (%) | After 0.5 days | | 12 | 55 | 0 | 1 | 60 | 96 | 63 | 96 | 45 | 10 |
| | After 7 days | | 93 | 97 | 95 | 30 | 96 | 96 | 95 | 96 | 93 | 90 |
| Properties | Metal corrosion control and prevention properties | | O | O | O | O | O | O | O | O | O | O |
| | Adhesive strength | | 5 | 3 | 12 | 30 | 2 | 0.08 | 2 | 0.12 | 3 | 15 |
| | Adhesion to substrate | | X | X | X | X | X | O | X | X | X | X |
| | Adherend contamination resistance | | X | X | X | X | X | X | X | O | X | X |
| | Low-temperature stability | | X | X | X | X | X | O | X | O | X | X |
| | Transparency of adhesive layer | | O | O | O | O | O | X | O | X | O | O |
| | Heat resistance | | X | X | X | X | X | X | X | X | X | X |
| | Humidity/heat resistance | | X | X | X | X | X | X | X | X | X | X |

ADHESIVE COMPOSITION

BACKGROUND

1. Field

Embodiments relate to an adhesive composition.

2. Description of the Related Art

Recently, flat panel displays (FPDs), such as liquid crystal displays (LCDs), plasma display panels (PDPs), and organic electroluminescent (EL) displays, have been increasingly used.

SUMMARY

Embodiments are directed to an adhesive composition.

The embodiments may be realized by providing an adhesive composition including 100 parts by weight of a (meth)acrylic copolymer having a weight average molecular weight of about 100,000 to about 2,000,000 g/mol; about 0.05 to about 5 parts by weight of a carbodiimide crosslinker, based on 100 parts by weight of the (meth)acrylic copolymer; and about 0.001 to about 5 parts by weight of an imidazole compound represented by Formula 1, based on 100 parts by weight of the (meth)acrylic copolymer:

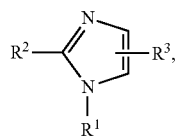

[Formula 1]

wherein, in Formula 1, $R^1$, $R^2$, and $R^3$ are each independently a hydrogen atom, a halogen atom, or a substituted or unsubstituted C1 to C10 straight or branched alkyl group.

The (meth)acrylic copolymer may be prepared from a monomer mixture including about 0 to about 9 parts by weight of a carboxyl group containing monomer, about 0 to about 9 parts by weight of a hydroxyl group containing (meth)acrylic monomer, and about 82 to about 99.9 parts by weight of a (meth)acrylic acid ester monomer, a total amount of the carboxyl group containing monomer and the hydroxyl group containing (meth)acrylic monomer being greater than 0 parts by weight and a total amount of the carboxyl group containing monomer, the hydroxyl group containing (meth)acrylic monomer, and the (meth)acrylic acid ester monomer being 100 parts by weight.

The adhesive composition may further include about 0.05 to about 5 parts by weight of an isocyanate crosslinker, based on 100 parts by weight of the (meth)acrylic copolymer.

The adhesive composition may further include a silane coupling agent.

The embodiments may also be realized by providing an optical member including an adhesive layer prepared from the adhesive composition according to an embodiment.

The (meth)acrylic copolymer may have a weight average molecular weight of about 1,000,000 to about 1,800,000 g/mol, and the adhesive layer may have an adhesive strength of about 0.5 to about 9 N/25 mm according to JIS Z0237.

The adhesive layer may have a gel fraction of about 50 to about 95% after forming the adhesive composition into an adhesive layer and leaving the adhesive layer at about 23° C. and about 50% RH for about 0.5 days.

The embodiments may also be realized by providing a surface protective film including an adhesive layer prepared from the adhesive composition according to an embodiment.

The (meth)acrylic copolymer may have a weight average molecular weight of about 150,000 to about 950,000 g/mol, and the adhesive layer may have an adhesive strength of about 0.05 to about 0.3 N/25 mm according to JIS Z0237.

The adhesive layer may have a gel fraction of about 70 to about 100% after forming the adhesive composition into an adhesive layer and leaving the adhesive layer at about 23° C. and about 50% RH for about 0.5 days.

The embodiments may also be realized by providing an adhesive sheet including an adhesive layer prepared from the adhesive composition according to an embodiment.

The (meth)acrylic copolymer may have a weight average molecular weight of about 150,000 to about 950,000 g/mol, and the adhesive layer may have an adhesive strength of about 0.05 to about 20 N/25 mm according to JIS Z0237.

The adhesive layer may have a gel fraction of about 70 to about 100% after forming the adhesive composition into an adhesive layer and leaving the adhesive layer at about 23° C. and about 50% RH for about 0.5 days.

BRIEF DESCRIPTION OF THE DRAWINGS

The embodiments will become apparent to those of ordinary skill in the art by describing in detail exemplary embodiments with reference to the attached drawings, in which:

FIG. 1 illustrates Table 2 listing properties for samples prepared in Preparation examples 1-19;

FIG. 2 illustrates Table 4 listing properties for samples prepared in Examples 1-10;

FIG. 3 illustrates Table 5 listing properties for samples prepared in Comparative Examples 1-9;

FIG. 4 illustrates Table 6 listing properties for samples prepared in Preparation examples 20-39;

FIG. 5 illustrates Table 8 listing properties for samples prepared in Examples 11-20;

FIG. 6 illustrates Table 9 listing properties for samples prepared in Comparative Examples 10-19;

FIG. 7 illustrates Table 10 listing properties for samples prepared in Preparation examples 40-59;

FIG. 8 illustrates Table 12 listing properties for samples prepared in Examples 21-30; and FIG. 9 illustrates Table 13 listing properties for samples prepared in Comparative Examples 20-29.

DETAILED DESCRIPTION

Japanese Patent Application No. 2010-244403, filed on Oct. 29, 2010, in the Japanese Intellectual Property office and Korean Patent Application No. 10-2011-0054207, filed on Jun. 3, 2011, in the Korean Intellectual Property Office, and entitled: "Adhesive Composition," are incorporated by reference herein in their entireties.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer or element is referred to as being "on" another layer or substrate, it can be directly on the other layer or substrate, or intervening layers may also be present.

According to an embodiment, an adhesive composition may include, e.g., (A) 100 parts by weight of a (meth)acrylic copolymer having a weight average molecular weight of about 100,000 to about 2,000,000 g/mol; (B) about 0.05 to about 5 parts by weight of a carbodiimide crosslinker; and (C) about 0.001 to about 5 parts by weight of an imidazole compound represented by Formula 1.

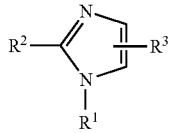

[Formula 1]

The (meth)acrylic copolymer (A) may be prepared from a monomer mixture including e.g., (a1) about 0 to about 9 parts by weight of a carboxyl group containing monomer, (a2) about 0 to about 9 parts by weight of a hydroxyl group containing (meth)acrylic monomer, and (a3) about 82 to about 99.9 parts by weight of a (meth)acrylic acid ester monomer. In an implementation, a total amount of the carboxyl group containing monomer (a1) and the hydroxyl group containing (meth)acrylic monomer (a2) may be greater than 0 parts by weight, and a total amount of the carboxyl group containing monomer (a1), the hydroxyl group containing (meth)acrylic monomer (a2) and the (meth)acrylic acid ester monomer (a3) may be about 100 parts by weight.

As described above, the adhesive composition may include a carbodiimide crosslinker (as a crosslinker) and an imidazole compound. When the carbodiimide crosslinker and the imidazole compound are used together, the adhesive composition may have a long pot life and an adhesive layer may be cross-linked (cured) within a short aging time after adhesive processing without affecting adhesive properties, thereby substantially improving workability and productivity.

Further, an adhesive layer formed of or prepared from the adhesive composition according to an embodiment may be used as an adhesive for an optical member. The adhesive for an optical member may not only have proper adhesive strength and adhesion to a substrate, but may also exhibit excellent metal corrosion control and prevention properties, light leakage resistance, durability, adherend contamination resistance, low-temperature stability, and reworkability.

Further, an adhesive layer formed of or prepared from the adhesive composition according to an embodiment may be used as an adhesive for surface protective films. The adhesive for surface protective films may have proper adhesive strength or adhesion to a substrate, may exhibit excellent metal corrosion control and prevention properties, adherend contamination resistance, low-temperature stability, and transparency, and may control/prevent generation of bubbles under high-temperature and high-pressure conditions (in autoclaving).

In addition, an adhesive layer formed of or prepared from the adhesive composition according to an embodiment may be used as an adhesive for an adhesive sheet. The adhesive for an adhesive sheet may have proper adhesive strength or adhesion to a substrate and may exhibit excellent metal corrosion control and prevention properties, adherend contamination resistance, low-temperature stability, transparency, heat resistance, and humidity/heat resistance.

Hereinafter, components of the adhesive composition according to an embodiment will be described in more detail. Herein, the term "(meth)acrylate" collectively refers to both acrylate and methacrylate. Further, a (meth) compound will collectively refer to both a compound and a (meth)-containing compound. For example, "(meth)acryl" includes both acryl and methacryl, "(meth)acrylate" includes both acrylate and methacrylate, and "(meth)acrylic acid" includes both acrylic acid and methacrylic acid.

(Meth)acrylic copolymer

A (meth)acrylic copolymer (hereinafter, also referred to as "component A") according to the present embodiment may contain, e.g., may be prepared from a monomer mixture including or consisting of, (a1) about 0 to about 9 parts by weight of a carboxyl group containing monomer, (a2) about 0 to about 9 parts by weight of a hydroxyl group containing (meth)acrylic monomer, and (a3) about 82 to about 99.9 parts by weight of a (meth)acrylic acid ester monomer. In an implementation, a total amount of the carboxyl group containing monomer (a1) and the hydroxyl group containing (meth) acrylic monomer (a2) may be greater than 0 parts by weight. In addition, a total amount of the carboxyl group containing monomer (a1), the hydroxyl group containing (meth)acrylic monomer (a2), and the (meth)acrylic acid ester monomer (a3) may be about 100 parts by weight. The (meth)acrylic copolymer may have a weight average molecular weight of about 100,000 to about 2,000,000 g/mol.

(a1) Carboxyl Group Containing Monomer

The carboxyl group containing monomer (hereinafter, also referred to as "component (a1)") may be an unsaturated monomer having at least one carboxyl group. Examples of the carboxyl group containing monomer may include (meth)acrylic acid, maleic acid, maleic anhydride, fumaric acid, fumaric anhydride, crotonic acid, itaconic acid, itaconic anhydride, myristoleic acid, palmitoleic acid, oleic acid, and the like. These monomers may be used alone or in combination of two or more thereof.

In an implementation, (meth)acrylic acid, maleic acid, maleic anhydride, fumaric acid, fumaric anhydride, crotonic acid, itaconic acid, and itaconic anhydride are preferable; and (meth)acrylic acid is more preferable.

The carboxyl group containing monomer may be included in the monomer mixture in an amount of about 0 to about 9 parts by weight. Within this range, proper crosslinking points may be formed by reaction of the carboxyl group and the carbodiimide crosslinker (B), thereby securing flexibility of the adhesive composition as well as light leakage resistance and durability of an adhesive layer.

(a2) Hydroxyl Group Containing (Meth)Acrylic Monomer

The hydroxyl group containing (meth)acrylic monomer (hereinafter, also referred to as "component (a2)") may be an acrylic monomer having a hydroxyl group in the molecule. Examples of the hydroxyl group containing (meth)acrylic monomer may include 2-hydroxyethyl(meth)acrylate, 4-hydroxybutyl(meth)acrylate, 1,6-hexanediol mono(meth)acrylate, pentaerythritol tri(meth)acrylate, dipentaerythritol penta (meth)acrylate, neopentylglycol mono(meth)acrylate, trimethylolpropane di(meth)acrylate, trimethylolethane di(meth)acrylate, 2-hydroxypropyl (meth)acrylate, 2-hydroxybutyl(meth)acrylate, 2-hydroxy-3-phenyloxypropyl (meth)acrylate, 4-hydroxycyclohexyl(meth)acrylate, N-2-hydroxyethyl(meth)acrylamide, cyclohexane dimethanol monoacrylate, and the like. In an implementation, the hydroxyl group containing (meth)acrylic monomer may include compounds obtained by addition reaction of a glycidyl group containing compound, such as alkyl glycidyl ether, allyl glycidyl ether, and glycidyl(meth)acrylate, with (meth)acrylic acid. These monomers may be used alone or in a combination thereof.

In an implementation, 2-hydroxyethyl (meth)acrylate, 4-hydroxybutyl(meth)acrylate, N-2-hydroxyethyl(meth) acrylamide, and cyclohexane dimethanol monoacrylate are preferable; and 2-hydroxyethyl(meth)acrylate, 4-hydroxybutyl(meth)acrylate, and N-2-hydroxyethyl(meth)acrylamide are more preferable.

The hydroxyl group containing (meth)acrylic monomer may be included in the monomer mixture in an amount of about 0 to about 9 parts by weight. Within this range, proper crosslinking points may be formed by reaction of the hydroxyl group and the carbodiimide crosslinker (B), thereby securing flexibility of the adhesive composition as well as light leakage resistance and durability of an adhesive layer.

(a3) (Meth)Acrylic Acid Ester Monomer

The (meth)acrylic acid ester monomer (hereinafter, also referred to as "component (a3)") may be an ester of (meth) acrylic acid having no hydroxyl group in the molecule. Examples of the (meth)acrylic acid ester monomer may include methyl (meth)acrylate, ethyl(meth)acrylate, propyl (meth)acrylate, isopropyl(meth)acrylate, n-butyl(meth)acrylate, isobutyl(meth)acrylate, tert-butyl(meth)acrylate, isoamyl(meth)acrylate, n-hexyl(meth)acrylate, n-heptyl (meth)acrylate, n-octyl(meth)acrylate, tert-octyl(meth)acrylate, 2-ethylhexyl(meth)acrylate, decyl(meth)acrylate, isodecyl(meth)acrylate, tridecyl(meth)acrylate, stearyl(meth)acrylate, isostearyl(meth)acrylate, phenyl(meth)acrylate, benzyl(meth)acrylate, dodecyl(meth)acrylate, tetrahydrofurfuryl(meth)acrylate, cyclohexyl(meth)acrylate, 4-n-butylcyclohexyl(meth)acrylate, 2-ethylhexyl diglycol(meth)acrylate, butoxyethyl(meth)acrylate, butoxymethyl(meth)acrylate, 3-methoxybutyl(meth)acrylate, 2-(2-methoxyethoxy)ethyl(meth)acrylate, 2-(2-butoxyethoxy) ethyl(meth)acrylate, 4-butylphenyl(meth)acrylate, phenyl (meth)acrylate, 2,4,5-trimethyl phenyl(meth)acrylate, phenoxymethyl(meth)acrylate, phenoxyethyl(meth)acrylate, polyethylene oxide monoalkyl ether(meth)acrylate, polypropylene oxide monoalkyl ether(meth)acrylate, trifluoroethyl (meth)acrylate, pentadecafluorooxyethyl(meth)acrylate, 2-chloroethyl(meth)acrylate, 2,3-dibromopropyl(meth)acrylate, tribromophenyl(meth)acrylate, and the like. These (meth)acrylic acid ester monomers may be used alone or in combination of two or more thereof.

In an implementation, methyl(meth)acrylate, ethyl(meth) acrylate, n-butyl(meth)acrylate, and 2-ethylhexyl(meth) acrylate are preferable; and methyl(meth)acrylate, n-butyl (meth)acrylate, and 2-ethylhexyl(meth)acrylate are more preferable.

The (meth)acrylic acid ester monomer (a3) may be included in the monomer mixture in an amount of about 82 to about 99.9 parts by weight.

The (meth)acrylic copolymer (A) may be prepared by any suitable method, e.g., solution polymerization, emulsion polymerization, suspension polymerization, reverse-phase suspension polymerization, thin-film polymerization, and spray polymerization, which use a polymerization initiator. Polymerization control may be conducted by thermal insulation polymerization, temperature control polymerization, and isothermal polymerization. In addition to a method of using a polymerization initiator to initiate polymerization, irradiation, electromagnetic radiation, and UV radiation may be used to initiate polymerization. For example, solution polymerization using a polymerization initiator may be used so that molecular weight is readily adjusted and impurities are decreased. In an implementation, the (meth)acrylic copolymer may be produced by adding about 0.01 to 0.5 parts by weight of a polymerization initiator to about 100 parts by weight of the total amount of the monomers using ethyl acetate, toluene, or methyl ethyl ketone as a solvent, followed by reaction under a nitrogen atmosphere at about 60 to 90° C. for about 3 to 10 hours. Examples of the polymerization initiator may include azo compounds, such as azobisisobutyronitrile (AIBN), 2-2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, such as hydrogen peroxide, ammonium persulfate, potassium persulfate, sodium persulfate and the like. These initiators may be used alone or in combination of two or more thereof As desired, the copolymer may further include other monomers copolymerizable with the monomers (a1) to (a3). Examples of the other monomers may include an epoxy group containing acrylic monomer, such as glycidyl(meth) acrylate and methyl glycidyl(meth)acrylate; an amino group containing acrylic monomer, such as dimethylaminoethyl (meth)acrylate, diethylaminoethyl(meth)acrylate, N-tert-butylaminoethyl(meth)acrylate, and methacryloxyethyl trimethylammonium chloride(meth)acrylate; an amide group containing acrylic monomer, such as (meth)acrylamide, N-methylol(meth)acrylamide, N-methoxymethyl(meth) acrylamide, and N,N-methylene bis(meth)acrylamide; a phosphate group containing acrylic monomer, such as 2-methacryloyloxyethyl diphenyl phosphate(meth)acrylate, trimethacryloyloxyethyl phosphate(meth)acrylate, and triacryloyloxyethyl phosphate(meth)acrylate; a sulfonic acid group containing acrylic monomer, such as sodium sulfopropyl(meth)acrylate, sodium-2-sulfoethyl(meth)acrylate, and sodium-2-acrylamido-2-methylpropane sulfonate; a urethane group containing acrylic monomer, such as urethane (meth)acrylate; a phenyl group containing acrylic vinyl monomer, such as p-tert-butylphenyl(meth)acrylate and o-biphenyl(meth)acrylate; a silane group containing vinyl monomer, such as 2-acetoacetoxyethyl(meth)acrylate, vinyltrimethoxysilane, vinyltriethoxysilane, vinyl tris(β-methoxyethyl)silane, vinyl triacetylsilane, and methacryloyloxypropyltrimethoxysilane; styrene, chlorostyrene, α-methylstyrene, vinyltoluene, vinyl chloride, vinyl acetate, vinyl propionate, acrylonitrile, vinyl pyridine, and the like. These monomers may be used alone or in combination of two or more thereof.

In an implementation, (meth)acrylamide, glycidyl(meth) acrylate, dimethylaminoethyl(meth)acrylate, 2-acetoacetoxyethyl(meth)acrylate, and vinyl acetate are preferable; and (meth)acrylamide and vinyl acetate are more preferable.

The other monomers may be used in an amount of about 0.1 to about 10 parts by weight, e.g., about 0.2 to about 5 parts by weight or about 0.3 to about 3 parts by weight, based on about 100 parts by weight of the total amount of the monomers (a1) to (a3).

The (meth)acrylic copolymer (A) prepared by copolymerization of the above monomers may have a weight average molecular weight Mw of about 100,000 to about 2,000,000 g/mol. Maintaining the weight average molecular weight at about 100,000 or greater may help ensure that sufficient heat resistance is obtained. Maintaining the weight average molecular weight at about 2,000,000 or less may help ensure that sufficient adhesion is obtained and may help prevent a decrease in tack. Here, the weight average molecular weight may be based on a polystyrene standard measured by the method stated in the following examples.

It should be noted that the total amount of the monomer (a1) and the monomer (a2) may not be 0 parts by weight. For example, the (meth)acrylic copolymer (A) may include at least one of a constituent or repeating unit derived from the monomer (a1) and a constituent or repeating unit derived from the monomer (a2). The total amount of the monomers (a1), (a2), and (a3) may be about 100 parts by weight.

The (meth)acrylic copolymer (A) may be used alone or in a combination of at least two polymers.

(B) Carbodiimide Curing Agent

The adhesive composition may include a carbodiimide crosslinker (hereinafter, also referred to as "component (B)") in addition to the copolymer (A). The carbodiimide crosslinker may react with and may be coupled with a hydroxyl group and/or a carboxyl group of the (meth)acrylic copolymer (A), thereby forming a cross-linked structure.

The carbodiimide crosslinker may include any suitable carbodiimide crosslinker, e.g., a compound having at least two carbodiimide groups (—N=C=N—) and/or a polycarbodiimide.

In an implementation, the carbodiimide compound may include high-molecular-weight polycarbodiimide prepared by decarbonation condensation reaction of diisocyanate in the presence of a carbodiimide catalyst.

Examples of the carbodiimide compound may include compounds obtained by decarbonation condensation reaction of the following diisocyanates.

Examples of the diisocyanates may include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, and the like, which may be used alone or in combination of two or more thereof.

Examples of the carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, and 3-phospholene isomers thereof.

These high-molecular-weight polycarbodiimides may be obtained by synthesis or from commercially available products. Commercially available products of the component (B) may include CARBODILITE® (Nisshinbo Chemical Inc.), e.g., CARBODILITE® V-01, V-03, V-05, V-07, and V09, which have excellent compatibility with organic solvents.

The carbodiimide crosslinker (B) may be present in an amount of about 0.05 to about 5 parts by weight, based on 100 parts by weight of the (meth)acrylic copolymer (A). Within this range, a proper cross-linked structure may be formed, thereby helping realize excellent heat resistance. Maintaining the amount of carbodiimide crosslinker (B) at about 0.05 parts by weight or greater may help ensure that a sufficiently cross-linked structure is formed, thereby preventing a reduction in heat resistance. Maintaining the amount of carbodiimide crosslinker (B) at about 5 parts by weight or less may help prevent excessive cross-linking, thereby helping to prevent a decrease in tack and thus helping ensure the ability to deal with contraction of a polarizer plate over time, and helping to prevent a reduction in light leakage resistance durability.

The carbodiimide crosslinker (B) may be used alone or in a combination of at least two kinds.

(C) Imidazole Compound

The adhesive composition may include an imidazole compound (hereinafter, also referred to as "component (C)") in addition to the component (A) and the component (B). The imidazole compound may function as a cross-linking (curing) accelerator with respect to the carbodiimide crosslinker. The adhesive composition including both the carbodiimide crosslinker and the imidazole compound may exhibit practical adhesive properties within a short aging time and thus may have excellent productivity.

The imidazole compound may be represented by Formula 1, below.

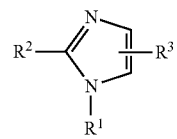

[Formula 1]

In Formula 1, $R^1$, $R^2$, and $R^3$ may each independently be a hydrogen atom, a halogen atom, or a substituted or unsubstituted C1 to C10 straight or branched alkyl group.

Examples of the halogen may include a fluorine atom, a chlorine atom, a bromine atom, and/or an iodine atom.

Examples of the C1 to C10 straight or branched alkyl group may include a methyl group, an ethyl group, an n-propyl group, an isopropyl group, an n-butyl group, an isobutyl group, a sec-butyl group, a tert-butyl group, an n-pentyl group, an isoamyl group, a tert-pentyl group, a neopentyl group, an n-hexyl group, a 3-methylpentane-2-yl group, a 3-methylpentane-3-yl group, a 4-methylpentyl group, a 4-methylpentane-2-yl group, a 1,3-dimethylbutyl group, a 3,3-dimethylbutyl group, 3,3-dimethylbutane-2-yl group, an n-heptyl group, a 1-methylhexyl group, a 3-methylhexyl group, a 4-methylhexyl group, a 5-methylhexyl group, a 1-ethylpentyl group, a 1-(n-propyl)butyl group, a 1,1-dimethylpentyl group, a 1,4-dimethylpentyl group, a 1,1-diethylpropyl group, a 1,3,3-trimethylbutyl group, a 1-ethyl-2,2-dimethylpropyl group, an n-octyl group, a 2-ethylhexyl group, a 2-methylhexane-2-yl group, a 2,4-dimethylpentane-3-yl group, a 1,1-dimethylpentane-1-yl group, a 2,2-dimethylhexane-3-yl group, a 2,3-dimethylhexane-2-yl group, a 2,5-dimethylhexane-2-yl group, a 2,5-dimethylhexane-2-yl group, a 3,4-dimethylhexane-3-yl group, a 3,5-dimethylhexane-3-yl group, a 1-methylheptyl group, a 2-methylheptyl group, a 5-methylheptyl group, a 2-methylheptane-2-yl group, a 3-methylheptane-3-yl group, a 4-methylheptane-3-yl group, a 4-methylheptane-4-yl group, a 1-ethylhexyl group, a 2-ethylhexyl group, a 1-propylpentyl group, a 2-propylpentyl group, a 1,1-dimethylhexyl group, a 1,4-dimethylhexyl group, a 1,5-dimethylhexyl group, a 1-ethyl-1-methylpentyl group, a 1-ethyl-4-methylpentyl group, a 1,1,4-trimethylpentyl group, a 2,4,4-trimethylpentyl group, a 1-isopropyl-1,2-dimethylpropyl group, a 1,1,3,3-tetramethylbutyl group, an n-nonyl group, a 1-methyloctyl group, a 6-methyloctyl group, a 1-ethylheptyl group, a 1-(n-butyl)pentyl group, a 4-methyl-1-(n-propyl)pentyl group, a 1,5,5-trimethylhexyl group, a 1,1,5-trimethylhexyl group, a 2-methyloctane-3-yl group, an n-decyl group, a 1-methylnoyl group, a 1-ethyloctyl group, a 1-(n-butyl)hexyl group, a 1,1-dimethyloctyl group, a 3,7-dimethyloctyl group, and the like.

The alkyl group may be substituted by a substituent. Examples of the substituent may include a halogen atom, such as a fluorine atom, a chlorine atom, a bromine atom, and an iodine atom; an alkyl group, such as a methyl group, an ethyl group, a tert-butyl group, and a dodecyl group; an aryl group, such as a phenyl group, a p-tolyl group, a xylyl group, a cumenyl group, a naphthyl group, an anthryl group, and a phenanthryl group; an alkoxy group, such as a methoxy group, an ethoxy group, and a tert-butoxy group; an aryloxy group, such as a phenoxy group and a p-tolyloxy group; an alkoxycarbonyl group, such as a methoxycarbonyl group, a butoxycarbonyl group, an octyloxycarbonyl group, and a phenoxycarbonyl group; an acyloxy group, such as an acetoxy group, a propionyloxy group, a methacryloyloxy group, and a benzoyloxy group; an acyl group, such as an acetyl group, a benzoyl group, an isobutylyl group, an acryloyl group, a methacryloyl group, a methoxalyl group; an alkylamino group, such as a methylamino group and a cyclohexylamino group; a dialkylamino group, such as a dimethylamino group, a diethylamino group, a morpholino group, and a piperidino group; an arylamino group, such as a phenylamino group and a p-tolylamino group; a hydroxyl group, a carboxyl group, a formyl group, an amino group, a nitro group, a cyano group, a trifluoromethyl group, a trichloromethyl group, and the like.

Examples of the imidazole compound may include imidazole, 1-methylimidazole, 2-methylimidazole, 4-methylimidazole, 1-ethylimidazole, 2-ethylimidazole, 4-ethylimidazole, 1-propylimidazole, 2-propylimidazole, 4-propylimidazole, 1-butylimidazole, 2-butylimidazole, 4-butylimidazole, 1-pentylimidazole, 2-pentylimidazole, 4-pentylimidazole, 1-hexylimidazole, 2-hexylimidazole, 4-hexylimidazole, 1-heptylimidazole, 2-heptylimidazole, 4-heptylimidazole, 1-octylimidazole, 2-octylimidazole, 4-octylimidazole, 1-nonylimidazole, 2-nonylimidazole, 4-nonylimidazole, 1-decylimidazole, 2-decylimidazole, 4-decylimidazole, 1,2-dimethylimidazole, 1,2-diethylimidazole, 1-ethyl-2-methylimidazole, 2-ethyl-4-methylimidazole, 1,4-dimethylimidazole, 1,5-dimethylimidazole, 1,2,4-trimethylimidazole, 1,4-dimethyl-2-ethylimidazole, 2-fluoroimidazole, 4-fluoroimidazole, 2-bromoimidazole, 4-bromoimidazole, 2-iodoimidazole, 4-iodoimidazole, and the like.

In an implementation, a compound in which at least one of $R^1$, $R^2$ and $R^3$ is a substituted or unsubstituted C1 to C10 straight or branched alkyl group is preferable; and 1-methylimidazole, 1-ethylimidazole, 1-propylimidazole, 1-butylimidazole, 1,2-dimethylimidazole, and 2-ethyl-4-methylimidazole are more preferable in view of productivity and cost.

The imidazole compound (C) may be present in an amount of about 0.001 to about 5 parts by weight, based on 100 parts by weight of the (meth)acrylic copolymer (A). Maintaining the amount of the imidazole compound (C) at about 0.001 parts by weight or greater may help ensure that sufficient curing acceleration effects are obtained and that only a short aging time is needed after adhesive processing. Maintaining the amount of the imidazole compound (C) at about 5 parts by weight or less may help prevent an undesirable increase in adhesive strength. In an implementation, the amount of the imidazole compound may be about 0.001 to about 1 part by weight, e.g., about 0.015 to about 0.18 parts by weight or about 0.02 to about 0.15 parts by weight.

The imidazole compound (C) may be used alone or in a combination of at least two kinds. Further, the imidazole compound (C) may be obtained by synthesis or from commercially available products.

(D) Isocyanate Crosslinker

The adhesive composition may include an isocyanate crosslinker (hereinafter, also referred to as "component (D)"), in addition to the components (A), (B), and (C). When the isocyanate crosslinker (D) is included in the composition, an adhesive layer prepared from the composition may have improved durability.

Examples of the isocyanate crosslinker (D) may include aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TM-HDI), lysine diisocyanate, and norbornane diisocyanate (NBDI); alicyclic diisocyanates, such as trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; or isocyanurate-modified diisocyanates thereof. In an implementation, adducts of the foregoing isocyanate compounds and polyol compounds, such as trimethylolpropane, or biurets and isocyanurates of the isocyanate compounds may be used.

The isocyanate crosslinker (D) may be obtained by synthesis or from commercially available products. Examples of commercially available products of the isocyanate crosslinker (D) may include Coronate® L, Coronate® HL, Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™ E405-80T, Duranate™ TSE-100, Duranate™ D-101, and Duranate™ D-201 (all available from Asahi Kasei Corporation); and the like.

In an implementation, Coronate® L, Coronate® HL, Takenate® D-110N, and Duranate™ TPA-100 are preferable; and Coronate® L and Duranate™ TPA-100 are more preferable. The isocyanate crosslinker (D) may be used alone or in a combination of at least two kinds.

The isocyanate crosslinker (D) may be present in an amount of about 0.05 to about 5 parts by weight, based on 100 parts by weight of the (meth)acrylic copolymer (A). In an implementation, the isocyanate crosslinker may be present in an amount of about 0.1 to about 4 parts by weight, e.g., 0.15 to about 3 parts by weight. Within this range, an adhesive prepared from the adhesive composition may exhibit desired durability.

(E) Silane Coupling Agent

The adhesive composition may include a silane coupling agent (hereinafter, also referred to as "component (E)") in addition to the above components. When the silane coupling agent is added, reactivity may be improved and mechanical strength and adhesive strength of a cross-linked product may be enhanced. Examples of the silane coupling agent may include methyltrimethoxysilane, dimethyldimethoxysilane, trimethylmethoxysilane, n-propyltrimethoxysilane, ethyltrimethoxysilane, diethyldiethoxysilane, n-butyltrimethoxysilane, n-hexyltriethoxysilane, n-octyltrimethoxysilane, phenyltrimethoxysilane, diphenyldimethoxysilane, cyclohexylmethyldimethoxysilane, vinyltrichlorosilane, vinyltrimethoxysilane, vinyltriethoxysilane, vinyl tris(β-methoxyethoxy)silane, β-(3,4-epoxycyclohexyl)ethyltrimethoxysilane, 3-glycidoxyprolylmethyldiethoxysilane, γ-glycidoxypropyltrimethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, γ-mercaptopropylmethyldimethoxysilane, Bis[3-(triethoxysilyl)propyl]tetrasulfide, γ-isocyanatopropyltriethoxysilane, and the like. In an implementation, a compound having a hydrolytic silyl group (obtained by reaction of a silane coupling agent having a functional group, such as an epoxy group (glycidoxy group), an amino group, a mercapto group, and/or a (meth)acryloyl group, a silane coupling agent having a functional group reactive to the foregoing functional groups, other coupling agents, and polyisocyanate at a certain ratio with respect to each functional group) may be used.

As the silane coupling agent (E), an oligomeric silane coupling may be used. The oligomeric silane coupling agent may have a —Si—O—Si— structure formed by condensation of two or more silane compounds, each of which having at least an alkoxy group. The —Si—O—Si— structure may be formed such that at least one alkoxy group is bonded to one of the silicon atoms. The oligomeric silane coupling agent may include an organic functional group.

Examples of the organic functional group may include vinyl, epoxy, styryl, (meth)acryloyl, methacryloxy, acryloxy, amino, ureido, chloropropyl, mercapto, and polysulfide groups, and the like. In an implementation, epoxy, mercapto, and (meth)acryloyl groups are preferable; and epoxy and mercapto groups are particularly preferable in order to help simultaneously attain improved durability and low tack of an adhesive layer prepared from the composition.

The oligomeric silane coupling agent may be an oligomer that has two silicon atoms (i.e. a dimer) to about 100 silicon atoms in one molecule, e.g., an average degree of polymerization of about 2 to about 100. The oligomeric silane coupling agent may become viscous with an increasing average degree of polymerization. Accordingly, the average degree of polymerization of the oligomeric silane coupling agent may be about 2 to about 80, e.g., about 3 to about 50, which may help prevent the oligomeric silane coupling agent from forming a paste or solid form, thereby easing handling.

The organic functional group included in the oligomeric silane coupling agent may be bonded to a silicon atom via a suitable linker. Examples of suitable linkers may include alkylene groups, such as methylene, ethylene, trimethylene, hexamethylene, and decamethylene groups; divalent hydrocarbon groups interrupted by an aromatic ring, such as methylphenylethyl; and divalent aliphatic groups interrupted by an oxygen atom, such as methoxymethyl, methoxyethyl, and methoxypropyl groups, and the like. When the organic functional group is an epoxy group, a functional group may be formed between two adjacent carbon atoms forming a ring.

The oligomeric silane coupling agent may be a cooligomer obtained by partial co-hydrolysis and polycondensation of a tetraalkoxysilane and a silane compound represented by Formula 2, below.

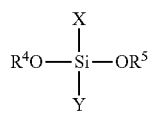

[Formula 2]

In Formula 2, $R^4$ and $R^5$ may each independently be an alkyl or a phenyl group, X may be an organic group having a mercapto, an epoxy, or a (meth)acryloyloxy group, and Y may be an alkyl, an alkoxy, a phenyl, a phenoxy, an aralkyl, or an aralkyloxy group.

$R^4$ and $R^5$ in Formula 2 may be independent of each other, e.g., a C1 to C10 alkyl group. For example, $R^4$ and $R^5$ may each independently be a methyl or an ethyl group.

Examples of the organic functional group represented by X may include mercaptomethyl, 3-mercaptopropyl, 6-mercaptohexyl, 10-mercaptodecyl, 2-(4-mercaptomethylphenyl)ethyl, glycidoxymethyl, 3-glycidoxypropyl, 2-(3,4-epoxycyclohexyl)ethyl, acryloyloxymethyl, 3-acryloyloxypropyl, methacryloyloxymethyl, and 3-methacryloyloxypropyl groups, and the like.

In an implementation, Y may be a C1 to C10 alkyl or alkoxy group, a C7 to C10 aralkyl, or an aralkyloxy group.

Examples of the functional group-containing silane compound represented by Formula 2 may include mercaptomethyltrimethoxysilane, 3-mercaptopropyltrimethoxysilane, 3-mercaptopropyltriethoxysilane, 2-(4-mercaptomethylphenyl)ethyltrimethoxysilane, 6-mercaptohexyltrimethoxysilane, 10-mercaptodecyltrimethoxysilane, 3-mercaptopropylmethyldimethoxysilane, 3-mercaptopropylmethyldiethoxysilane, glycidoxymethyltrimethoxysilane, 3-glycidoxypropyltrimethoxysilane, 2-(3, 4-epoxycyclohexyl)ethyltrimethoxysilane, 3-glycidoxypropylmethyldimethoxysilane, acryloyloxymethyltrimethoxysilane, 3-acryloyloxypropyltrimethoxysilane, 3-acryloyloxypropyltriethoxysilane, methacryloyloxymethyltrimethoxysilane, 3-methacryloyloxypropyltrimethoxysilane, 3-methacryloyloxypropyltriethoxysilane, 3-methacryloyloxypropyltributoxysilane, 3-acryloyloxypropylmethyldimethoxysilane, 3-methacryloyloxypropylmethyldimethoxysilane, 3-methacryloyloxypropylmethyldiethoxysilane, and the like.

The tetraalkoxysilane (which may be partially co-hydrolyzed and polycondensed with the functional group-containing silane compound represented by Formula 2) may have four alkoxy groups bonded to each silicon atom. Each of the alkoxy groups may have 1 to 10 carbon atoms. The four alkoxy groups bonded to the silicon atom may be the same or different. In terms of ease of production and purchase, a compound having the same alkoxy groups bonded to a silicon atom may be used, e.g., tetramethoxysilane, tetraethoxysilane, tetrapropoxysilane, and/or tetrabutoxysilane.

The oligomeric silane coupling agent may be prepared by partial co-hydrolysis and polycondensation of the functional group-containing silane compound represented by Formula 2 and the tetraalkoxysilane. In this case, the alkoxysilyl or phenoxysilyl groups as —$OR^4$ or —$OR^5$ bonded to the silicon atom may be partially hydrolyzed to form a silanol group. The alkoxysilyl groups of the tetraalkoxysilane may be partially hydrolyzed to form a silanol group. Condensation of the two silanol groups may yield the oligomeric silane coupling agent. Use of the oligomer may help prevent the adhesive composition from being dispersed during coating and drying.

Examples of the monomeric oligomeric silane coupling agent may include the following:

Mercaptomethyl group-containing cooligomers, e.g., mercaptomethyltrimethoxysilane-tetramethoxysilane, mercaptomethyltrimethoxysilane-tetraethoxysilane, mercaptomethyltriethoxysilane-tetramethoxysilane, mercaptomethyltriethoxysilane-tetraethoxysilane cooligomers, and the like.

Mercaptopropyl group-containing cooligomers, e.g., 3-mercaptopropyltrimethoxysilane-tetramethoxysilane, 3-mercaptopropyltrimethoxysilane-tetraethoxysilane, 3-mercaptopropyltriethoxysilane-tetramethoxysilane, 3-mercaptopropyltriethoxysilane-tetraethoxysilane cooligomers, and the like.

Glycidoxymethyl group-containing cooligomers, e.g., glycidoxymethyltrimethoxysilane-tetramethoxysilane, glycidoxymethyltrimethoxysilane-tetraethoxysilane, glycidoxymethyltriethoxysilane-tetramethoxysilane, glycidoxymethyltriethoxysilane-tetraethoxysilane cooligomers, and the like.

Glycidoxypropyl group-containing cooligomers, e.g., 3-glycidoxypropyltrimethoxysilane-tetramethoxysilane, 3-glycidoxypropyltrimethoxysilane-tetraethoxysilane, 3-glycidoxypropyltriethoxysilane-tetramethoxysilane, 3-glycidoxypropyltriethoxysilane-tetraethoxysilane cooligomers, and the like.

Methacryloyloxypropyl group-containing cooligomers, e.g., acryloyloxypropyl group-containing cooligomers, such as 3-acryloyloxypropyltrimethoxysilane-tetramethoxysilane, 3-acryloyloxypropyltrimethoxysilane-tetraethoxysilane, 3-acryloyloxypropyltriethoxysilane-tetramethoxysilane, 3-acryloyloxypropyltriethoxysilane-tetraethoxysilane, 3-acryloyloxypropylmethyldimethoxysilane-tetramethoxysilane, 3-acryloyloxypropylmethyldimethoxysilane-tetraethoxysilane, 3-acryloyloxypropylmethyldiethoxysilane-tetramethoxysilane, and 3-acryloyloxypropylmethyldiethoxysilane-tetraethoxysilane cooligomers, 3-methacryloyloxypropyltrimethoxysilane-tetramethoxysilane, 3-methacryloyloxypropyltrimethoxysilane-tetraethoxysilane, 3-methacryloyloxypropyltriethoxysilane-tetramethoxysilane, 3-methacryloyloxypropyltriethoxysilane-tetraethoxysilane, 3-methacryloyloxypropylmethyldimethoxysilane-tetramethoxysilane, 3-methacryloyloxypropylmethyldimethoxysilane-tetraethoxysilane, 3-methacryloyloxypropylmethyldiethoxysilane-tetramethoxysilane, 3-methacryloyloxypropylmethyldiethoxysilane-tetraethoxysilane cooligomers, and the like.

The silane coupling agent may be obtained by synthesis or from commercially available products. Examples of commercially available products applicable for use as the silane coupling agent may include KBM-303, KBM-403, KBE-402, KBE-403, KBE-502, KBE-503, KBM-5103, KBM-573, KBM-802, KBM-803, KBE-846, KBE-9007 (all available from Shin-Etsu Chemical Co., Ltd.); X-41-1805, X-41-1810, X-41-1053, and X-41-1058 (Trade names, all available from Shin-Etsu Chemical Co. Ltd). X-41-1805 is an oligomeric silane coupling agent having mercapto, methoxy, and ethoxy groups, X-41-1810 is an oligomeric silane coupling agent having mercapto, methyl, and methoxy groups, X-41-1053 is an oligomeric silane coupling agent having epoxy, methoxy, and ethoxy groups, and X-41-1058 is an oligomeric silane coupling agent having epoxy, methyl, and methoxy groups.

In an implementation, KBM-303, KBM-403, KBE-402, KBE-403, KBM-5103, KBM-573, KBM-802, KBM-803, KBE-846, KBE-9007, X-41-1805, and X-41-1810 are preferable; and KBM-403 and X-41-1810 are more preferable. The silane coupling agents may be used alone or in combination thereof.

An amount of the silane coupling agent is not particularly limited. If added, the silane coupling agent (E) may be present in an amount of about 0.03 to about 1 part by weight, e.g., about 0.05 to about 0.5 parts by weight or about 0.1 to about 0.3 parts by weight, based on 100 parts by weight of the (meth)acrylic copolymer (A). Within this range, excellent heat resistance and adhesion may be obtained.

The adhesive composition may include additives in addition to or instead of the silane coupling agent. Examples of the additives may include curing accelerators, ionic liquid, lithium salt, inorganic fillers, softeners, antioxidants, anti-aging agents, stabilizers, tackifier resins, reforming resins (polyol resin, phenolic resin, acrylic resin, polyester resin, polyolefin resin, epoxy resin, epoxylated poly-butadiene resin, etc.), leveling agents, antifoaming agents, plasticizers, dyes, pigments (coloring and extender pigments), treatment agents, UV blocking agents, fluorescent whitening agents, dispersants, heat stabilizers, light stabilizers, UV absorbers, anti-static agents, lubricants, and solvents. Examples of the curing accelerator may include dibutyltin dilaurate, JCS-50 (Johoku Chemical Company Ltd.), and Formate TK-1 (Mitsui Chemicals Inc.). Examples of the ionic liquid may include materials having cations, such as phosphonium, pyridinium, pyrrolidinium, imidazolium, guanidinium, ammonium, isouronium, thiouronium, piperidium, pyrazolium, and sulfonium ions, and materials having anions, such as halides, nitrates, sulfates, phosphates, perchlorates, thiocyanate, thiosulfate, sulfites, tetrafluoroborate, hexafluorophosphate, formate, oxalate, acetate, trifluoroacetate, and alkyl sulfonate ions. Examples of the antioxidant may include dibutylhydroxytoluene (BHT), Irganox® 1010, Irganox® 1035FF, and Irganox® 565 (all available from BASF Japan Co., Ltd.). Examples of the tackifier resin may include rosins, such as rosin acid, polymerized rosin acid, and rosin acid esters, terpene resins, terpene phenolic resin, aromatic hydrocarbon resins, aliphatic saturated hydrocarbon resins, and petroleum resins. If the adhesive composition includes these additives, the amount of the additives is not specifically limited, and may be about 0.1 to about 20 parts by weight, based on about 100 parts by weight of the total amount of the components (A) to (C).

The adhesive composition according to an embodiment may be prepared by mixing the above components at once or in order, or mixing a plurality of random components first and then adding remaining components, and stirring the components to homogeneity. For example, the adhesive composition may be prepared by heating the components to about 20 to about 40° C., as desired, and stirring using a stirrer for about 5 minutes to about 5 hours until the mixture is uniform.

A viscosity of the adhesive composition is not specifically limited. In an implementation, the adhesive composition may have a viscosity of about 300 to about 7,000 mPa·s at about 25° C., immediately after preparation (within about 10 minutes after mixing the components for a predetermined time) in order to facilitate application and control of the thickness of an adhesive layer to be formed of the adhesive composition. In an implementation, for an adhesive of an optical member, the adhesive composition may have a viscosity about 2,000 to about 6,000 mPa·s, e.g., about 2,500 to about 5,000 mPa·s, at about 25° C. immediately after preparation (within about 10 minutes after mixing the components for a predetermined time). For an adhesive of a surface protective film, the adhesive composition may have a viscosity about 350 to about 5,000 mPa·s, e.g., about 400 to about 4,000 mPa·s, at about 25° C. immediately after preparation (within about 10 minutes after mixing the components for a predetermined time). For an adhesive of an adhesive sheet, the adhesive composition may have a viscosity about 350 to about 6,800 mPa·s, e.g., about 400 to about 6,500 mPa·s at about 25° C. immediately after preparation (within about 10 minutes after mixing the components for a predetermined time). The viscosity may be measured by the process described in the following examples.

The adhesive composition may have an excellent pot life as excessive viscosity increase or gelation of the adhesive composition may be controlled after preparation.

Pot life may be evaluated by comparing the viscosity of the composition immediately after preparation with the viscosity of the composition about 12 hours after preparation. For example, it is desirable that the composition is not gelated about 12 hours after preparation. It is more desirable that the viscosity of the adhesive composition about 12 hours after preparation is increased by about 3% or less as compared with the viscosity of the composition immediately after preparation. Within this range, the adhesive composition may have excellent workability.

Herein, the expression "immediately after" may mean "within about 10 minutes." For example, "the viscosity of the adhesive composition immediately after preparation of the composition" may refer to the viscosity of the adhesive composition measured within about 10 minutes after completion of preparation of the adhesive composition (after the components are mixed for a predetermine time).

An adhesive layer of the adhesive composition according to an embodiment may be obtained by cross-linking the adhesive composition. Here, cross-linking of the adhesive composition may be conducted after application of the adhesive composition. However, in an implementation, an adhesive layer formed of the cross-linked adhesive composition may be transferred to a substrate. The adhesive composition may be cross-linked at about 70 to about 140° C. for about 1 to about 5 minutes.

The adhesive layer formed of the adhesive composition may exhibit practical adhesive performance within a short aging time of about 0.5 days after adhesive processing (cross-linking). The practical adhesive performance of the adhesive layer may be evaluated by comparing a gel fraction of the adhesive layer via storage at about 23° C. and about 50% RH for about 0.5 days after adhesive processing (cross-linking) with the gel fraction of the adhesive layer via storage at about 23° C. and about 50% RH for about 7 days after adhesive processing (cross-linking). In an implementation, the gel fraction after storage for about 7 days may be within the gel fraction after storage for about 0.5 days±5%, e.g., within the gel fraction after storage for about 0.5 days±3%. Within this range, the adhesive composition may have considerably improved productivity. The gel fraction may be measured by the process described in the following examples.

The adhesive composition may be used to bond various materials, e.g., glass, plastic films, paper, metal foil, or the like. The glass may include inorganic glass. Plastics of the plastic films may include polyvinyl chloride resins, polyvinylidene chloride, cellulose resins, acrylic resins, cycloolefin resins, amorphous polyolefin resins, polyethylene, polypropylene, polystyrene, ABS resin, polyamide, polyester, polycarbonate, polyurethane, polyvinyl alcohol, an ethylene-vinyl acetate copolymer, and chlorinated polypropylene. The amorphous polyolefin resins include a polymer unit of a cyclic polyolefin, such as norbornene or multiple-ring norbornene monomers, and may be a copolymer of cyclic olefin and a chain-cyclic olefin. Commercially available products of amorphous polyolefin resins may include ATON™ (JSR Co., Ltd.), ZEONEX® and ZEONR® (Nihon Zeon Co., Ltd.), APO® and APEL® (Mitsui Chemicals Inc.), etc. The amorphous polyolefin resins may be formed into a film by a suitable method, e.g., solvent casting and melt extrusion. Further, examples of paper may include vellum paper, wood free paper, kraft paper, art coat paper, caster coat paper, bowl paper, artificial parchment, waterproof paper, glassine paper, and linerboard. An example of metal foil may include aluminum foil.

Other embodiments provide an optical member, a surface protective film, and an adhesive sheet that includes an adhesive layer formed of or prepared from the adhesive composition according to an embodiment.

Hereinafter, uses of the adhesive composition according to an embodiment will be illustrated in detail as follows, without being limited thereto.

<Optical Member>

The adhesive composition according to an embodiment may be applied directly to one or more sides of an optical member to form an adhesive layer. Alternatively, an adhesive layer (prepared in advance by depositing the adhesive composition on a release film) may be transferred to one or more sides of an optical member. For example, the embodiments provide an optical member including an adhesive layer formed of the adhesive composition according to an embodiment.

Examples of the optical member may include a polarizer plate, a phase difference plate, an optical film for PDPs, a conductive film for touch panels, or the like. For example, the adhesive composition of an embodiment may exhibit excellent adhesion to a polarizer plate and glass. However, the embodiments are not limited thereto, and the adhesive composition may also be used to bond other materials.

When the adhesive composition is used for an adhesive layer of an optical member, the component (A) in the composition may be prepared from a monomer mixture including (a1) about 0 to about 9 parts by weight of the carboxyl group containing monomer, (a2) about 0 to about 9 parts by weight of the hydroxyl group containing (meth)acrylic monomer, and (a3) about 82 to about 99.9 parts by weight of the (meth) acrylic acid ester monomer, and may have a weight average molecular weight of about 1,000,000 to about 2,000,000 g/mol.

Here, it should be noted that the total amount of the components (a1) and (a2) may not be 0 parts by weight. For example, the (meth)acrylic copolymer (A) may include at least one of a constituent or repeating unit derived from the component (a1) and a constituent or repeating unit derived from the component (a2). Further, the total amount of the components (a1), (a2), and (a3) may be about 100 parts by weight.

In an implementation, the amount of the component (a1) in the monomer mixture used to prepare the component (A) for the optical member may be about 0 to about 8 parts by weight, e.g., about 0 to about 7.5 parts by weight or about 0 to about 7 parts by weight. In another implementation, the amount of the component (a2) in the monomer mixture used to prepare the component (A) for the optical member may be about 0 to about 4 parts by weight, e.g., about 0 to about 3.5 parts by weight or about 0 to about 3 parts by weight. In another implementation, the amount of the component (a3) in the monomer mixture used to prepare the component (A) for the optical member may be about 88 to about 99.9 parts by weight, e.g., about 89 to about 99.9 parts by weight or about 90 to about 99.9 parts by weight.

A total amount of the component (a1) and the component (a2) in the monomer mixture used to prepare the component (A) for the optical member may be about 0.1 to about 12 parts by weight, e.g., about 0.1 to about 11 parts by weight or about 0.1 to about 10 parts by weight.

The component (A) for the optical member may have a weight average molecular weight of about 1,000,000 to about 1,800,000 g/mol, e.g., about 1,100,000 to about 1,700,000 g/mol.

The component (B) of the adhesive composition for the optical member may be present in an amount of about 0.07 to about 4.5 parts by weight, e.g., about 0.1 to about 4 parts by weight, based on 100 parts by weight of the component (A).

The component (C) of the adhesive composition for the optical member may be present in an amount of about 0.01 to about 0.5 parts by weight, e.g., about 0.015 to about 0.18 parts by weight or about 0.02 to about 0.15 parts by weight, based on 100 parts by weight of the component (A). Within this range, the adhesive composition for the optical member may have a long pot life to obtain excellent workability and may attain practical adhesive properties within a short aging time of about 0.5 days after adhesive processing to considerably improve productivity.

Also, if present, the component (D) may be present in an amount of about 0.1 to about 4 parts by weight, e.g., about 0.15 to about 3 parts by weight, based on 100 parts by weight of the component (A).

In addition, for the optical member, the adhesive composition may further include the silane coupling agent (E). Examples and amounts of the silane coupling agent (E) are described above and thus are not repeated herein.

The adhesive composition for the optical member may be applied by any suitable method, e.g., using a natural coater, a knife belt coater, a floating knife, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. Although adjusted based on materials and purposes, the thickness of the applied adhesive composition for the optical member (thickness after drying) may be about 5 to about 35 μm, e.g., about 15 to about 30 μm.

When the adhesive composition is used for the optical member, the adhesive layer may have a gel fraction of about 50 to about 95%, e.g., about 60 to about 92% or about 70 to about 90%, via storage for about 0.5 days at about 23° C. and about 50% RH after adhesive processing. Within this range, the optical member having the adhesive layer may quickly undergo punching or slitting. In order to set the gel fraction within the above range, conditions may be properly selected, e.g., the compositions of the monomers of the component (A) or the amount of the component (B) or the component (C) may be adjusted as described above.

In the optical member, the adhesive layer (e.g., formed in the optical member) may have an adhesive strength of about 0.5 to about 9 (N/25 mm), e.g., about 1 to about 6 (N/25 mm). Within this range, favorable reworkability may be obtained. The adhesive strength may be measured according to a test method of pressure sensitive adhesive tapes and sheets disclosed in JIS Z0237, 2000, specifically by the process described in the following examples.

The adhesive composition used for the optical member may have a long pot life to obtain excellent workability and may attain practical adhesive properties within a short aging time of about 0.5 days after adhesive processing to considerably improve productivity. Further, the adhesive layer obtained from the adhesive composition for the optical member may not only have proper adhesive strength or proper adhesion to a substrate but may also exhibit excellent metal corrosion control and prevention properties, light leakage resistance, durability, adherend contamination resistance, low-temperature stability, and reworkability.

<Surface Protective Film>

The adhesive composition according to an embodiment may be suitably used for a surface protective film, e.g., for a surface protective film for an optical member. For example, the embodiments provide a surface protective film including an adhesive layer formed of the adhesive composition according to an embodiment.

The protection film may include any suitable protection film. Examples of the protection film may include resin films, such as polyethylene terephthalate, polyethylene, polypropylene, ethylene-vinyl acetate copolymer, polyester, polyvinyl chloride, polycarbonate, polyamide, and polystyrene films, or composite films thereof In an implementation, a polyethylene terephthalate film may be used. The protection film may have a thickness of about 15 to about 50 μm.

The adhesive layer may be formed on the protection film by applying the adhesive composition directly to the protection film, by transferring the adhesive composition deposited on a separate substrate (e.g., release liner), or the like.

The surface protective film may be used to protect an optical member coupled with a flat display panel, such as LCDs or PDPs. The optical member may include, e.g., a polarizer plate, a phase difference plate, a brightness enhancement plate, a glare shielding sheet, or the like. In an implementation, the optical member may be a laminate of at least two optical elements, e.g., a laminate of a polarizer plate and a phase difference plate, a laminate of phase difference plates, a laminate of a polarizer plate and a brightness enhancement plate or a glare shield sheet, etc. In another implementation, the surface protective film may be used not only as an independent optical member for distribution but also as an optical member coupled to a flat display panel for distribution.

When the adhesive composition is used for an adhesive layer of a surface protective film, the component (A) included in the composition may be prepared from a monomer mixture including (a1) about 0 to about 9 parts by weight of the carboxyl group containing monomer, (a2) about 0.4 to about 9 parts by weight of the hydroxyl group containing (meth) acrylic monomer and (a3) about 82 to about 99.6 parts by weight of the (meth)acrylic acid ester monomer, and may have a weight average molecular weight of about 100,000 to about 1,000,000 g/mol. The total amount of the components (a1), (a2) and (a3) may be about 100 parts by weight.

In an implementation, the amount of the component (a1) in the monomer mixture used to prepare the component (A) for the surface protective film may be about 0 to about 3 parts by weight, e.g., about 0 to about 2.5 parts by weight or about 0 to about 2 parts by weight. In another implementation, the amount of the component (a2) in the monomer mixture used to prepare the component (A) for the surface protective film may be about 0.5 to about 9 parts by weight, e.g., about 0.6 to about 9 parts by weight or about 0.7 to 9 parts by weight. In another implementation, the amount of the component (a3) in the monomer mixture used to prepare the component (A) for the optical member may be about 88 to about 99.5 parts by weight, e.g., about 88.5 to about 99.4 parts by weight or about 89 to about 99.3 parts by weight.

A total amount of the component (a1) and the component (a2) in the monomer mixture used to prepare the component (A) for the surface protective film may be about 0.5 to about 12 parts by weight, e.g., about 0.6 to about 11.5 parts by weight or about 0.7 to about 11 parts by weight.

The component (A) for the surface protective film may have a weight average molecular weight of about 150,000 to about 950,000 g/mol, e.g., about 200,000 to about 900,000 g/mol.

The component (B) of the adhesive composition for the surface protective film may be present in an amount of about 0.1 to 5 parts by weight, e.g., about 0.15 to about 4.5 parts by weight, based on 100 parts by weight of the component (A). The component (C) of the adhesive composition for the surface protective film may be present in an amount of about 0.01 to about 0.5 parts by weight, e.g., about 0.015 to about 0.18 parts by weight or about 0.02 to about 0.15 parts by weight, based on 100 parts by weight of the component (A). Within this range, the adhesive composition for the surface protective film may have a long pot life to obtain excellent workability and may attain practical adhesive properties within a short aging time of about 0.5 days after adhesive processing to considerably improve productivity.

Also, if used, the component (D) may be present in an amount of about 0.1 to about 4 parts by weight, e.g., about 0.15 to about 3 parts by weight, based on 100 parts by weight of the component (A).

In addition, for the surface protective film, the adhesive composition may not include the silane coupling agent (E).

The adhesive composition for the surface protective film may be applied by any suitable method, e.g., using a natural coater, a knife belt coater, a floating knife, roll coating, air-knife coating, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. In an implementation, roll coating, gravure coating, reverse coating, roll brushing, spraying, air-knife coating, and die coating may be used. Although adjusted based on materials and purposes, the thickness of the applied adhesive composition formed on the surface protective film (thickness of the adhesive layer: thickness after drying) may be about 3 to about 200 μm, e.g., about 10 to about 100 μm.

When the adhesive composition is used for the surface protective film, the adhesive layer may have a gel fraction of about 70 to about 100%, e.g., about 80 to about 99% or about 85 to about 98%, via storage for about 0.5 days at about 23° C. and about 50% RH after adhesive processing. Within this range, the surface protective film having the adhesive layer may be quickly subjected to punching or slitting. In order to set the gel fraction within the above range, conditions may be properly selected, e.g., the compositions of the monomers of the component (A) or the amount of the component (B) or the component (C) may be adjusted as described above.

In the surface protective film, the adhesive layer formed in the surface protective film may have an adhesive strength of about 0.05 to about 0.3 (N/25 mm), e.g., about 0.09 to about 0.2 (N/25 mm). Within this range, favorable adherend contamination resistance can be obtained.

The adhesive composition used for the surface protective film may have a long pot life to obtain excellent workability and may attain practical adhesive properties within a short aging time of about 0.5 days after adhesive processing to considerably improve productivity. Further, the adhesive layer obtained from the adhesive composition may have proper adhesive strength or proper adhesion to a substrate and excellent metal corrosion control and prevention properties, adherend contamination resistance, low-temperature stability, and transparency and control/prevent foaming under high-temperature and high-humidity conditions (as in autoclaving).

<Adhesive Sheet>

The adhesive composition according to an embodiment may be formed into an adhesive layer through application to a substrate or separator and drying (crosslinking), thereby preparing an adhesive sheet in a sheet or tape shape. For example, the embodiments provide an adhesive sheet including an adhesive layer formed of the adhesive composition according to an embodiment.

Examples of the substrate for the adhesive sheet may include plastic films, such as a polyester film such as a polyethylene terephthalate (PET) film, a polypropylene film, and a cellophane film, plastics, such as polyurethane and an ethylene-propylene terpolymer, or various suitable thin materials, such as rubber foam, paper, and aluminum foil. These substrates may undergo surface treatment, such as corona treatment, plasma treatment, and formation of an easy bonding layer, or may have an antistatic layer on the surface depending on materials. Further, examples of the separator may include the plastic films used for the substrate, which are surface-treated with silicon, fluorine, and long-chain alkyl peel-treating agents, or a polypropylene film which is not surface-treated.

When the adhesive layer is formed on a substrate, the adhesive layer may be formed on one surface of the substrate to prepare a one-sided adhesive sheet or may be formed on each of both surfaces to prepare a double-sided adhesive sheet. In the double-sided adhesive sheet, the adhesive layer may be formed on one surface of the substrate only, thereby preparing a tape having different adhesives on opposite sides. When the adhesive layer is formed on a separator, a double-sided adhesive sheet may be prepared.

When the adhesive composition is used for an adhesive layer of an adhesive sheet, the component (A) included in the composition may be prepared from a monomer mixture including (a1) about 0 to about 9 parts by weight of the carboxyl group containing monomer, (a2) about 0 to about 9 parts by weight of the hydroxyl group containing (meth) acrylic monomer and (a3) about 82 to about 99.9 parts by weight of the (meth)acrylic acid ester monomer, and may have a weight average molecular weight of about 100,000 to about 1,000,000 g/mol.

Here, it should be noted that the total amount of the components (a1) and (a2) may not be 0 parts by weight. For example, the (meth)acrylic copolymer (A) may include at least one of a constituent or repeating unit derived from the component (a1) and a constituent or repeating unit derived from the component (a2). The total amount of the components (a1), (a2), and (a3) may be about 100 parts by weight.

In an implementation, the amount of the component (a1) in the monomer mixture used to prepare the component (A) for the adhesive sheet may be about 0 to about 8 parts by weight, e.g., about 0 to about 7.5 parts by weight or about 0 to about 7 parts by weight. In another implementation, the amount of the component (a2) in the monomer mixture used to prepare the component (A) for the adhesive sheet may be about 0 to about 8 parts by weight, e.g., about 0 to about 7.5 parts by weight or about 0 to about 7 parts by weight. In another implementation, the amount of the component (a3) in the monomer mixture used to prepare the component (A) for the adhesive sheet may be about 84 to about 99.9 parts by weight, e.g., about 85 to about 99.8 parts by weight or about 86 to about 99.7 parts by weight.

A total amount of the component (a1) and the component (a2) in the monomer mixture used to prepare the component (A) for the adhesive sheet may be about 0.1 to about 16 parts by weight, e.g., about 0.2 to about 15 parts by weight or about 0.3 to about 14 parts by weight.

The component (A) for the adhesive sheet may have a weight average molecular weight of about 150,000 to about 950,000 g/mol, e.g., about 200,000 to about 900,000 g/mol.

The component (B) of the adhesive composition for the adhesive sheet may be present in an amount of about 0.07 to about 4.5 parts by weight, e.g., about 0.1 to about 4 parts by weight, based on 100 parts by weight of the component (A). The component (C) of the adhesive composition for the adhesive sheet may be present in an amount of about 0.01 to about 0.5 parts by weight, e.g., about 0.015 to about 0.18 parts by weight or about 0.02 to about 0.15 parts by weight, based on 100 parts by weight of the component (A). Within this range, the adhesive composition for the adhesive sheet may have a long pot life to obtain excellent workability and may attain practical adhesive properties within a short aging time of about 0.5 days after adhesive processing to considerably improve productivity.

Also, if used, the component (D) may be present in an amount of about 0.1 to about 4 parts by weight, e.g., about 0.15 to about 3 parts by weight, based on 100 parts by weight of the component (A).

In addition, for the adhesive sheet, the adhesive composition may not include the silane coupling agent (E).

The adhesive composition for the adhesive sheet may be applied by any suitable method, e.g., using a natural coater, a knife belt coater, a floating knife, roll coating, air-knife coating, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater and the like. In an implementation, roll coating, gravure coating, reverse coating, roll brushing, spraying, air-knife coating, and/or die coating may be used. Although adjusted based on materials and purposes, the thickness of the applied adhesive composition formed on the adhesive sheet (thickness of the adhesive layer: thickness after drying) may be about 3 to about 200 μm, e.g., about 5 to about 100 μm.

When the adhesive composition is used for the adhesive sheet, the adhesive layer may have a gel fraction of about 70 to about 100%, e.g., about 80 to about 99% or about 85 to about 98%, via storage for about 0.5 days at about 23° C. and about 50% RH after adhesive processing. Within this range, the adhesive sheet having the adhesive layer may quickly undergo punching or slitting. In order to set the gel fraction within the above range, conditions may be properly selected, e.g., the compositions of the monomers of the component (A) or the amount of the component (B) or the component (C) may be adjusted as described above.

In the adhesive sheet, the adhesive layer formed in the adhesive sheet may have an adhesive strength of about 0.05 to about 20 (N/25 mm), e.g., about 0.1 to about 20 (N/25 mm). Within this range, the adhesive sheet may be applied to various adhesive sheets in a sheet or tape shape which need adhesive strength.

The adhesive composition used for the adhesive sheet may have a long pot life to obtain excellent workability and may attain practical adhesive properties within a short aging time of about 0.5 days after adhesive processing to considerably improve productivity. Further, the adhesive layer obtained from the adhesive composition may not only have proper adhesive strength or proper adhesion to a substrate but excellent metal corrosion control and prevention properties, adherend contamination resistance, low-temperature stability, transparency, heat resistance, and humidity/heat resistance.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

The solid content and viscosity of the polymer solutions obtained in the following Preparation examples, the viscosity of the adhesive compositions, and the weight average molecular weight of the polymers (A) were measured by the following process.

<Solid Content>

About 1 g of a polymer solution was precisely measured on a precisely weighed glass plate. The solution was dried at 105° C. for 1 hour and cooled to room temperature and then a total mass of the glass plate and the remaining solid content was precisely measured. Defining the mass of the glass plate as X, the total mass of the glass plate and the polymer solution before drying as Y, and the total mass of the glass plate and the remaining solid content as Z, a solid content was calculated by Equation 1:

$$\text{Solid content } (\%) = \{(Z-X)/(Y-X)\} \times 100 \quad \text{[Equation 1]}$$

<Viscosity>

The temperature of a polymer solution or an adhesive composition in a glass bottle was adjusted to about 25° C. and then viscosity was measured using a B-type viscometer. The viscosity of the adhesive composition was measured twice, immediately after preparation of the adhesive composition and 12 hours after preparation.

<Weight Average Molecular Weight>

The weight average molecular weight was measured by the following method under the following conditions illustrated in Table 1.

TABLE 1

| | |
|---|---|
| Equipment | Gel Permeation Chromatography (GPC, Device No. GPC-16) |
| Detector | Differential Refractive Index Detector (RI-8020, Sensitivity: 32, Tosoh Corporation) |
| | UV Absorbance Detector (2487, Wavelength: 215 nm, Sensitivity: 0.2 AUFS, Waters Co., Ltd.)) |
| Column | Two TSKgel GMHXL, One G2500HXL (S/N M0052, M0051, N0010, φ7.8 mm × 30 cm, Tosoh Corporation) |
| Solvent | Tetrahydrofuran (Wako Junyaku Co., Ltd.) |
| Flow rate | 1.0 ml/min |
| Column temperature | 23° C. |
| Sample | Concentration: About 0.2% |
| | Dissolving: Smoothly stirred at room temperature |
| | Solubility: Dissolved (identified with the naked eye) |
| | Filtration: Filtered through a 0.45 μm filter |
| Input | 0.200 ml |
| Reference sample | Monodispersed polystyrene |
| Data processing | GPC data processing system |

Preparation Example 1

99 parts by weight of n-butyl acrylate (Nihon Shokubai, Co., Ltd.), 1 part by weight of 2-hydroxyethyl acrylate (Nihon Shokubai, Co., Ltd.), and 120 parts by weight of ethyl acetate were placed in a flask equipped with a reflux condenser and an agitator, and were heated to 65° C. under a nitrogen atmosphere. 0.04 parts by weight of azobisisobutyronitrile (AIBN) was added, followed by polymerization for 6 hours while maintaining the mixture at 65° C. After completing polymerization, the mixture was diluted with 280 parts by weight of ethyl acetate, thereby obtaining a solution of a polymer (A-1). The solution of the polymer (A-1) had a solid content of 20% and a viscosity of 4,500 mPa·s. The polymer (A-1) had a weight average molecular weight of 1,600,000 g/mol.

Preparation Examples 2 to 19

Solutions of polymers (A-2) to (A-19) were prepared by the same process as in Preparation example 1 except that the monomers were mixed according to the compositions listed in Table 2 of FIG. 1. Then, the solid contents and the viscosities of the solutions of the polymers (A-2) to (A-19) and the weight average molecular weights of the polymers (A-2) to (A-19) were measured, and results are shown in Table 2. In Table 2, "BA," "MA," "2EHA," "HEA," "4HBA," "HEAA," and "AA" refer to butyl acrylate, methyl acrylate, 2-ethylhexyl acrylate, 2-hydroxyethyl acrylate, 4-hydroxybutyl acrylate, N-2-hydroxyethyl acrylamide, and acrylic acid, respectively.

Example 1

500 parts by weight of the solution of the polymer (100 parts by weight of the solid polymer) obtained in Preparation example 1, 1 part by weight of CARBODILITE® V-01 (B-1, Nisshinbo Chemical Inc.) as a carbodiimide crosslinker (B), 0.01 parts by weight of 1-methylimidazole (C-1, Tokyo Kasei Kogyo Co., Ltd.) as an imidazole compound (C), 0.2 parts by weight of Colonate L® (D-1, trimethylolpropane/tolylene diisocyanate trimer adduct, Nippon Polyurethane Industry Co., Ltd.) as an isocyanate crosslinker (D), and 0.1 parts by weight of X-41-1810 (E-1, Shin-Etsu Chemical Co., Ltd.) as a silane coupling agent were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 90° C. for 3 minutes, thereby forming an adhesive layer (adhesive processing). Then, the adhesive layer was attached to a polarizer plate, thereby producing an adhesive layer-attached polarizer plate.

Examples 2 to 10 and Comparative Examples 1 to 9

Adhesive composition solutions and adhesive layer-attached polarizer plates were prepared in the same process as in Example 1 except that the polymers obtained in Preparation examples 2 to 19, a carbodiimide crosslinker, an imidazole compound, an isocyanate crosslinker, a silane coupling agent, and an additional crosslinker were used according to the compositions listed in Tables 4 and 5 of FIGS. 2 and 3. Details of carbodiimide cross-linkers B-2 and B-3, imidazole compounds C-2, C-3, and C-4, silane coupling agents E-2, E-3, and E-4, and an additional crosslinker F-1 are illustrated in Table 3, below.

TABLE 3

| | |
|---|---|
| Carbodiimide crosslinker (B) | B-2: CARBODILITE ® V-05 (Nisshinbo Chemical Inc) |
| | B-3: CARBODILITE ® V-09 (Nisshinbo Chemical Inc) |
| Imidazole compound (C) | C-2: 1-butylimidazole (Tokyo Kasei Kogyo Co., Ltd.) |
| | C-3: 1,2-dimethylimidazole (Tokyo Kasei Kogyo Co., Ltd.) |
| | C-4: 2-ethyl-4-methylimidazole (Tokyo Kasei Kogyo Co., Ltd.) |
| Silane coupling agent (E) | E-2: 3-glycidoxypropylmethyldiethoxysilane (KBM-403, Shin-etsu Chemical Co., Ltd.) |
| | E-3: Compound represented by Formula 3: |

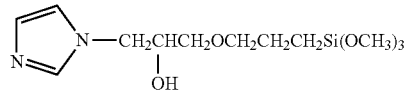

[Formula 3]

| | E-4: Compound represented by Formula 4: |

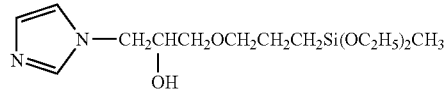

[Formula 4]

| Additional crosslinker (F) | F-1: 1,3-bis(N,N-diglycidylaminomethyl)cyclohexane (TETRAD D, Mitsubishi Gas Chemical Company, Inc.) |

Physical properties of the adhesive layer-attached polarizer plates obtained according to Examples 1 to 10 and Comparative Examples 1 to 9 were evaluated as follows.

1. Gel Fraction

Instead of the adhesive layer-attached polarizer plates according to Examples 1 to 10 and Comparative examples 1 to 9, each adhesive layer was deposited on a stripped polyester film to a dry thickness of 25 μm and subjected to adhesive processing (cross-linking), followed by measurement of gel fraction after storage for 0.5 days and then after storage for 7 days at 23° C. and 50% RH. That is, about 0.1 g of the adhesive composition, left at 23° C. and 50% RH, was weighed and defined as $W_1(g)$. This composition was placed in a sample bottle, and about 30 g of ethyl acetate was added thereto and left for 24 hours. After a predetermined time, the contents of the bottle were filtered through a 200-mesh stainless steel mesh (weight: $W_2(g)$). The mesh and the remaining materials were dried at 90° C. for 1 hour, and the total weight $W_3(g)$ was measured. The gel fraction was calculated by Equation 2 using the measured values:

$$\text{Gel fraction (\%)} = \{(W_3 - W_2)/W_1\} \times 100. \quad \text{[Equation 2]}$$

2. Metal Corrosion Control and Prevention Properties

The adhesive layer of each adhesive layer-attached polarizer plate, left at 23° C. and 50% RH for 0.5 days, was attached to aluminum foil and left at 60° C. and 90% RH for 2 days, followed by observation of corrosion. In Tables 4 and 5, no change is indicated by "O" and whitening (indicating corrosion) is indicated by "X."

3. Light Leakage Resistance

Each adhesive layer-attached polarizer plate, left at 23° C. and 50% RH for 0.5 days, was cut into a 120 mm (MD direction of the polarizer plate)×60 mm piece and a 120 mm (TD direction of the polarizer plate)×60 mm piece. The respective pieces were attached to opposites sides of a glass substrate, overlapping each other, and autoclaved at 50° C. and 0.49 MPa (5 kg/cm²) for 20 minutes. Then, the glass substrate was left at 80° C. for 120 hours and 500 hours, followed by observation of appearance. In Tables 4 and 5, no light leakage after 120 hours and 500 hours is indicated by "⊚," no light leakage after 120 hours is indicated by "0," and light leakage after 120 hours is indicated by "X."

4. Durability

Each adhesive layer-attached polarizer plate, left at 23° C. and 50% RH for 7 days, was cut into a 120 mm (MD direction of the polarizer plate)×60 mm piece. Each piece was attached to a glass substrate and autoclaved at 50° C. and 0.49 MPa (5 kg/cm²) for 20 minutes. Then, the glass substrate was left at 100° C. and at 80° C. and 90% RH for 120 hours, followed by observation of appearance. In Tables 4 and 5, no occurrence of bubbles, damage, or peeling is indicated by "O," while occurrence of bubbles, damage, or peeling is indicated by "X."

5. Adhesive Strength

Each adhesive layer-attached polarizer plate, left at 23° C. and 50% RH for 0.5 days, was cut into a 25 mm wide piece. The piece was attached to a glass substrate and autoclaved at 50° C. and 0.49 MPa (5 kg/cm$^2$) for 20 minutes. The adhesive strength of the adhesive layer was measured according to a test method of pressure sensitive adhesive tapes and sheets disclosed in JIS Z0237, 2000, using a tensile tester at a stripping angle of 90° and a stripping rate of 0.3 m/min under 23° C./50% RH conditions.

6. Adhesion to Substrate

While measuring adhesive strength, adhesion was evaluated. In Tables 4 and 5, the adhesive layer not separated from the substrate is indicated by "O," while the adhesive layer separated from the substrate is indicated by "X."

7. Adherend Contamination Resistance

The contact angle of the glass substrate was measured before and after measurement of the adhesive strength. The contact angle was measured according to a test method of wettability of a glass substrate disclosed in JIS R3257, 1999. In Tables 4 and 5, when a change in the contact angle of the glass substrate before and after measurement of the adhesive strength was 3° or less, it is indicated by "O," while when a change in the contact angle of the glass substrate before and after measurement of the adhesive strength was more than 3°, it is indicated by "X."

8. Low-Temperature Stability

Each adhesive layer-attached polarizer plate, left at 23° C. and 50% RH for 0.5 days, was cut into a 120 mm (MD direction of the polarizer plate)×60 mm piece. The piece was attached to a glass substrate and autoclaved at 50° C. and 0.49 MPa (5 kg/cm$^2$) for 20 minutes. Then, the glass substrate was left at −40° C. for 120 hours, followed by observation of appearance. In Tables 4 and 5, no occurrence of bubbles, separation, peeling, or recrystallized materials is indicated by "O," while occurrence of bubbles, separation, peeling, or recrystallized materials is indicated by "X."

9. Reworkability

While measuring adhesive strength, a separated state was observed. In Tables 4 and 5, appearance of interface failure is indicated by "O," and appearance of adhesion and/or cohesion failure of the adhesive to the glass substrate (adherend) is indicated by "X."

Evaluation results are shown in Tables 4 and 5.

As shown in Tables 4 and 5, the adhesive compositions according to Examples 1 to 10 exhibited excellent pot life and curing accelerating effects, compared with the adhesive compositions according to Comparative Examples 1 to 9. Accordingly, the adhesive compositions according to the embodiments may be considered to remarkably improve workability and productivity. Moreover, the polarizer plates using the adhesive compositions according to Examples 1 to 10 exhibited excellent light leakage resistance, durability, adhesion to substrate, adherend contamination resistance, low-temperature stability, and reworkability, compared with the polarizer plates of Comparative Examples 1 to 9.

Preparation Example 20

40 parts by weight of n-butyl acrylate (Nihon Shokubai, Co., Ltd.), 59 parts by weight of 2-ethylhexyl acrylate, 1 part by weight of 2-hydroxyethyl acrylate, and 150 parts by weight of ethyl acetate were placed in a flask equipped with a reflux condenser and an agitator, and were heated to 65° C. under a nitrogen atmosphere. 0.1 parts by weight of azobisisobutyronitrile (AIBN) was added, and 0.05 parts by weight of AIBN was further added after 1 hour, followed by polymerization for 6 hours while maintaining the mixture at 65° C. After completing polymerization, the mixture was diluted with 36 parts by weight of ethyl acetate and cooled to room temperature, thereby obtaining a solution of a polymer (A-20). The solution of the polymer (A-20) had a solid content of 35% and a viscosity of 3,500 mPa·s. The polymer (A-20) had a weight average molecular weight of 800,000 g/mol.

Preparation Examples 21 to 39

Solutions of polymers (A-21) to (A-39) were prepared by the same process as in

Preparation example 20 except that the monomers were mixed according to the compositions listed in Table 6 of FIG. 4. Then, the solid contents and the viscosities of the solutions of the polymers (A-21) to (A-39) and the weight average molecular weights of the polymers (A-21) to (A-39) were measured, and results are shown in Table 6. In Table 6, "BA," "2EHA," "HEA," "4HBA," "HEAA," "AA," and "AM" refer to butyl acrylate, 2-ethylhexyl acrylate, 2-hydroxyethyl acrylate, 4-hydroxybutyl acrylate, N-2-hydroxyethyl acrylamide, acrylic acid, and acylamide, respectively.

Example 11

286 parts by weight of the solution of the polymer (100 parts by weight of the solid polymer) obtained in Preparation example 20, 0.5 parts by weight of CARBODILITE® V-01 (B-1, Nisshinbo Chemical Inc.) as a carbodiimide crosslinker (B), 0.01 parts by weight of 1-methylimidazole (C-1, Tokyo Kasei Kogyo Co., Ltd.) as an imidazole compound (C), and 0.5 parts by weight of Duranate™ 24A-100 (D-2, hexamethylene diisocyanate•biuret, Asahi Kasei Corporation) as an isocyanate crosslinker (D) were mixed at room temperature (25° C.) for 10 minutes, thereby producing an adhesive composition solution.

The solution was applied to a PET release film (MRF38, Thickness: 38 μm, Mitsubishi Polyester Film Inc.) to a dry thickness of 25 μm and dried at 90° C. for 3 minutes, thereby forming an adhesive layer. Then, the adhesive layer was attached to a PET film (Lumirror® S10#25, Thickness: 23 μm, Toray Industries, Inc.), thereby producing a surface protective film.

Examples 12 to 20 and Comparative Examples 10 to 19

Adhesive composition solutions and surface protective films were prepared in the same process as in Example 11 except that the polymers obtained in Preparation examples 21 to 39, a carbodiimide crosslinker, an imidazole compound, an isocyanate crosslinker, and other additives were used according to the compositions listed in Tables 8 and 9 of FIGS. 5 and 6. Accordingly, surface protective films (2) to (10) and comparative surface protective films (1) to (10) were obtained. Details of a carbodiimide cross-linker B-3, imidazole compounds C-2, C-3, and C-4, an isocyanate crosslinker D-3, and other additives G-1, G2, G-3, and G-4 are illustrated in Table 7.

TABLE 7

| | |
|---|---|
| Carbodiimide crosslinker (B) | B-3: CARBODILITE ® V-09 (Nisshinbo Chemical Inc) |
| Imidazole compound (C) | C-2: 1-butylimidazole (Tokyo Kasei Kogyo Co., Ltd.)<br>C-3: 1,2-dimethylimidazole (Tokyo Kasei Kogyo Co., Ltd.)<br>C-4: 2-ethyl-4-methylimidazole (Tokyo Kasei Kogyo Co., Ltd.) |
| Isocyanate crosslinker (D) | D-3: Hexamethylene diisocyanate•isocyanurate (Duranate ™ TPA-100, Asahi Kasei Corporation) |
| Other additives (G) | G-1: Aluminium tris(acetylacetonate) (Alumichelate A, Kawaken Fine Chemicals Co., Ltd.)<br>G-2: Dibutyltin dilaurate (Tokyo Kasei Kogyo Co., Ltd.)<br>G-3: Acetylacetone (Tokyo Kasei Kogyo Co., Ltd.)<br>G-4: N,N,N',N'-tetraglycidyl-m-xylenediamine (TETRAD X, Mitsubishi Gas Chemical Company, Inc.) |

Physical properties of the surface protective films obtained according to Examples 11 to 20 and Comparative Examples 10 to 19 were evaluated as follows.

1. Gel Fraction

Instead of a PET film including each of the adhesive layers according to Examples 11 to 20 and Comparative examples 10 to 19, each adhesive layer was deposited on a stripped polyester film to a dry thickness of 25 μm and subjected to adhesive processing (cross-linking), followed by measurement of gel fraction after storage for 0.5 days and then after storage for 7 days at 23° C. and 50% RH. That is, about 0.1 g of the adhesive composition, left at 23° C. and 50% RH, was weighed and defined as $W_1(g)$. This composition was placed in a sample bottle, and about 30 g of ethyl acetate was added thereto and left for 24 hours. After a predetermined time, the contents of the bottle were filtered through a 200-mesh stainless steel mesh (weight: $W_2(g)$). The mesh and the remaining materials were dried at 90° C. for 1 hour, and the total weight $W_3(g)$ was measured. The gel fraction was calculated by Equation 2 using the measured values:

$$\text{Gel fraction (\%)} = \{(W_3 - W_2)/W_1\} \times 100. \quad \text{[Equation 2]}$$

2. Metal Corrosion Control and Prevention Properties

The adhesive layer of each surface protective film, left at 23° C. and 50% RH for 0.5 days, was attached to aluminum foil and left at 60° C. and 90% RH for 2 days, followed by observation of corrosion. In Tables 8 and 9, no change is indicated by "O" and whitening (indicating corrosion) is indicated by "X."

3. Adhesive Strength

Each surface protective film, left at 23° C. and 50% RH for 0.5 days, was cut into a 25 mm wide piece. The piece was attached to a polarizer plate and autoclaved at 50° C. and 0.49 MPa (5 kg/cm$^2$) for 20 minutes. The adhesive strength of the adhesive layer was measured according to a test method of pressure sensitive adhesive tapes and sheets disclosed in JIS Z0237, 2000, using a tensile tester at a stripping angle of 180° and a stripping rate of 0.3 m/min under 23° C./50% RH conditions.

4. Adhesion to Substrate

While measuring the adhesive strength, the adhesion to each protection film (substrate) was evaluated. In Tables 8 and 9, the adhesive layer not being separated from the substrate is indicated by "O," while the adhesive layer being separated from the substrate is indicated by "X."

5. Adherend Contamination Resistance

The contact angle of the polarizer plate was measured before and after measurement of the adhesive strength. The contact angle was measured according to a test method of wettability of glass substrates disclosed in JIS R3257, 1999. In Tables 8 and 9, when a change in the contact angle of the polarizer plate before and after measurement of the adhesive strength was 3° or less, it is indicated by "O," while when a change in the contact angle of the polarizer plate before and after measurement of the adhesive strength was more than 3°, it is indicated by "X."

6. Low-Temperature Stability

Each surface protective film, left at 23° C. and 50% RH for 0.5 days, was attached to a polarizer plate and autoclaved at 50° C. and 0.49 MPa (5 kg/cm$^2$) for 20 minutes. Then, the polarizer plate was left at −40° C. for 120 hours, followed by observation of appearance. In Tables 8 and 9, no occurrence of bubbles, separation, peeling, or recrystallized materials is indicated by "O," while occurrence of bubbles, separation, peeling, or recrystallized materials is indicated by "X."

7. Transparency of Adhesive Layer

Each surface protective film, left at 23° C. and 50% RH for 0.5 days, was observed with the naked eye to identify transparency of the adhesive film. In Tables 8 and 9, proper transparency is indicated by "O" and white turbidity of the adhesive layer is indicated by "X."

8. Autoclaving Suitability

Each surface protective film, left at 23° C. and 50% RH for 0.5 days, was cut into a 25 mm wide piece. The piece was attached to a polarizer plate and autoclaved at 50° C. and 0.49 MPa (5 kg/cm$^2$) for 20 minutes, followed by observation of bubbles. In Tables 8 and 9, no occurrence of bubbles is indicated by "O," while occurrence of bubbles is indicated by "X."

Evaluation results are shown in Tables 8 and 9.

As shown in Tables 8 and 9, the adhesive compositions according to Examples 11 to 20 exhibited excellent pot life and curing accelerating effects, compared with the adhesive compositions according to Comparative Examples 10 to 19. Accordingly, the adhesive compositions of the embodiments may be considered to remarkably improve workability and productivity. Moreover, the surface protective films according to Examples 11 to 20 exhibited excellent adhesion to substrate, adherend contamination resistance, low-temperature stability, transparency of the adhesive layers, and autoclaving suitability, compared with the polarizer plates Comparative Examples 10 to 19.

Preparation Example 40

40 parts by weight of n-butyl acrylate (Nihon Shokubai, Co., Ltd.), 59 parts by weight of 2-ethylhexyl acrylate, 1 part by weight of 2-hydroxyethyl acrylate, and 150 parts by weight of ethyl acetate were placed in a flask equipped with a reflux condenser and an agitator, and were heated to 65° C. under a nitrogen atmosphere. 0.1 parts by weight of azobisisobutyronitrile (AIBN) was added, and 0.05 parts by weight of AIBN was further added after 1 hour, followed by polymerization for 6 hours while maintaining the mixture at 65° C. After completing polymerization, the mixture was diluted with 36 parts by weight of ethyl acetate and cooled to room temperature, thereby obtaining a solution of a polymer (A-40). The solution of the polymer (A-40) had a solid content of 35% and a viscosity of 3,500 mPa·s. The polymer (A-40) had a weight average molecular weight of 800,000 g/mol.

Preparation Examples 41 to 59

Solutions of polymers (A-41) to (A-59) were prepared by the same process as in

Preparation example 40 except that the monomers were mixed according to the compositions listed in Table 10 of FIG. 7. Then, the solid contents and the viscosities of the solutions of the polymers (A-41) to (A-59) and the weight average molecular weights of the polymers (A-41) to (A-59) were measured, and results are shown in Table 10. In Table 10, "BA," "2EHA," "VAc," "HEA," "4HBA," "HEAA," "AA," and "AM" refer to butyl acrylate, 2-ethylhexyl acrylate, vinyl acetate, 2-hydroxyethyl acrylate, 4-hydroxybutyl acrylate, N-2-hydroxyethyl acrylamide, acrylic acid, and acylamide, respectively.

Example 21

286 parts by weight of the solution of the polymer (100 parts by weight of the solid polymer) obtained in Preparation example 40, 0.3 parts by weight of CARBODILITE® V-01 (B-1, Nisshinbo Chemical Inc.) as a carbodiimide crosslinker (B), 0.01 parts by weight of 1-methylimidazole (C-1, Tokyo Kasei Kogyo Co., Ltd.) as an imidazole compound (C), and 0.2 parts by weight of Duranate™ 24A-100 (D-2, hexamethylene diisocyanate•biuret, Asahi Kasei Corporation) as an isocyanate crosslinker (D) were mixed at room temperature (25° C.) for 10 minutes, thereby producing an adhesive composition solution.

The solution was applied to a PET release film (MRF38, Thickness: 38 µm, Mitsubishi Polyester Film Inc.) to a dry thickness of 25 µm and dried at 90° C. for 3 minutes, thereby forming an adhesive layer. Then, the adhesive layer was attached to a PET film (Lumirror® S10#25, Thickness: 23 µm, Toray Industries, Inc.), thereby producing an adhesive sheet (1).

Examples 22 to 30 and Comparative Examples 20 to 29

Adhesive composition solutions and adhesive sheets were prepared in the same process as in Example 21 except that the polymers obtained in Preparation examples 41 to 59, a carbodiimide crosslinker, an imidazole compound, an isocyanate crosslinker, and other additives were used according to the compositions listed in Tables 12 and 13 of FIGS. 8 and 9. Accordingly, adhesive sheets (2) to (10) and comparative adhesive sheets (1) to (10) were obtained. Details of carbodiimide cross-linkers B-2 and B-3, imidazole compounds C-2, C-3, and C-4, an isocyanate crosslinker D-3, and other additives G-1, G2, G-3, and G-4 are illustrated in Table 11.

TABLE 11

| | |
|---|---|
| Carbodiimide crosslinker (B) | B-2: CARBODILITE ® V-05 (Nisshinbo Chemical Inc) <br> B-3: CARBODILITE ® V-09 (Nisshinbo Chemical Inc) |
| Imidazole compound (C) | C-2: 1-butylimidazole (Tokyo Kasei Kogyo Co., Ltd.) <br> C-3: 1,2-dimethylimidazole (Tokyo Kasei Kogyo Co., Ltd.) <br> C-4: 2-ethyl-4-methylimidazole (Tokyo Kasei Kogyo Co., Ltd.) |
| Isocyanate crosslinker (D) | D-3: Hexamethylene diisocyanate•isocyanurate (Duranate ™ TPA-100, Asahi Kasei Corporation) |

TABLE 11-continued

| | |
|---|---|
| Other additives (G) | G-1: Aluminum tris(acetylacetonate) (Alumichelate A, Kawaken Fine Chemicals Co., Ltd.) <br> G-2: Dibutyltin dilaurate (Tokyo Kasei Kogyo Co., Ltd.) <br> G-3: Acetylacetone (Tokyo Kasei Kogyo Co., Ltd.) <br> G-4: N,N,N',N'-tetraglycidyl-m-xylenediamine (TETRAD X, Mitsubishi Gas Chemical Company, Inc.) |

Physical properties of the adhesive sheets obtained according to Examples 21 to 30 and Comparative Examples 20 to 29 were evaluated as follows.

1. Gel Fraction

Gel fraction was measured in the same manner as in Examples 11 to 20 and Comparative Examples 10 to 19.

2. Metal Corrosion Control and Prevention Properties

The adhesive layer of each adhesive sheet, left at 23° C. and 50% RH for 0.5 days, was attached to aluminum foil and left at 60° C. and 90% RH for 2 days, followed by observation of corrosion. In Tables 12 and 13, no change is indicated by "O" and whitening (indicating corrosion) is indicated by "X."

3. Adhesive Strength

Each adhesive sheet, left at 23° C. and 50% RH for 0.5 days, was cut into a 25 mm wide piece. The piece was pressed to a stainless steel plate, reciprocated once using a 2-kg roller, and left at 23° C. and 50% RH for 20 minutes. Then, the adhesive strength was measured according to a test method of pressure sensitive adhesive tapes and sheets disclosed in JIS Z0237, 2000, using a tensile tester at a stripping angle of 180° and a stripping rate of 0.3 m/min under 23° C./50% RH conditions.

4. Adhesion to Substrate

While measuring the adhesive strength, the adhesion to each adhesive sheet (substrate) was evaluated. In Tables 12 and 13, the adhesive layer not being separated from the substrate is indicated by "O," while the adhesive layer being separated from the substrate is indicated by "X."

5. Adherend Contamination Resistance

The contact angle of the stainless steel plate was measured before and after measurement of the adhesive strength. The contact angle was measured according to a test method of wettability of a glass substrate disclosed in JIS R3257, 1999. In Tables 12 and 13, when a change in the contact angle of the stainless steel plate before and after measurement of the adhesive strength was 3° or less, it is indicated by "O," while when a change in the contact angle of the stainless steel plate before and after measurement of the adhesive strength was more than 3°, it is indicated by "X."

6. Low-Temperature Stability

Each adhesive sheet, left at 23° C. and 50% RH for 0.5 days, was pressed to a stainless steel plate, reciprocated once using a 2-kg roller, and left at 23° C. and 50% RH for 1 hour. Then, the stainless steel plate was left at −40° C. for 120 hours, followed by observation of appearance. In Tables 12 and 13, no occurrence of bubbles, separation, peeling, or recrystallized materials is indicated by "O," while occurrence of bubbles, separation, peeling, or recrystallized materials is indicated by "X."

7. Transparency of Adhesive Layer

Each adhesive sheet, left at 23° C. and 50% RH for 0.5 days, was observed with the naked eye to identify transparency of the adhesive film. In Tables 12 and 13, proper transparency is indicated by "O" and white turbidity of the adhesive layer is indicated by "X."

8. Heat Resistance

Each adhesive sheet, left at 23° C. and 50% RH for 0.5 days, was pressed to a stainless steel plate, reciprocated once using a 2-kg roller, and left at 23° C. and 50% RH for 1 hour. Then, the stainless steel plate was left at 80° C. for 500 hours, followed by observation of appearance. In Tables 12 and 13, no appearance of bubbles, separation, or peeling is indicated by "O," while appearance of bubbles, separation, or peeling is indicated by "X."

9. Humidity/Heat Resistance

Each adhesive sheet, left at 23° C. and 50% RH for 0.5 days, was pressed to a stainless steel plate, reciprocated once using a 2-kg roller, and left at 23° C. and 50% RH for 1 hour. Then, the stainless steel plate was left at 60° C. and 90% RH for 500 hours, followed by observation of appearance. In Tables 12 and 13, no appearance of bubbles, separation, or peeling is indicated by "O," and appearance of bubbles, separation, or peeling is indicated by "X."

Evaluation results are shown in Tables 12 and 13.

As shown in Tables 12 and 13, the adhesive compositions according to Examples 21 to 30 exhibited excellent pot life and curing accelerating effects, compared with the adhesive compositions according to Comparative Examples 20 to 29. Accordingly, the adhesive compositions of the embodiments may remarkably improve workability and productivity. Moreover, the adhesive sheets according to Examples 21 to 30 exhibited excellent adhesion to substrate, adherend contamination resistance, low-temperature stability, transparency of the adhesive layers, heat resistance, and humidity/heat resistance, compared with the adhesive sheets of Comparative Examples 20 to 29.

By way of summation and review, an adhesive composition that includes an acrylic polymer, an isocyanate curing agent or an epoxy curing agent, and an imidazole silane compound, and exhibits excellent durability under high-temperature and high-humidity conditions may be used to prepare an adhesive layer that requires a long aging time of a day or more in order to exhibit practical adhesive performance after cross-linking, thereby reducing productivity.

An adhesive composition that includes an acrylic polymer and an isocyanate group containing a carbodiimide compound as a curing agent may have a high cross-linking speed and strong cohesion and adhesion. Thus, it may be suited to bonding of inorganic materials, such as glass, ceramics, and tiles. Further, the adhesive composition may have excellent adhesion, water resistance, and wet endurance in normal conditions due to a rapid increase in cohesion and also exhibits heat resistance, so that it does not swell or separate at high temperature. Furthermore, the adhesive composition may not leave adhesive residues when separating from an adherend. However, an adhesive layer formed of this adhesive composition may also require a long aging time of a day or more to exhibit practical adhesive performance after cross-linking, thereby reducing productivity.

An imidazole compound may be used as a curing agent or a curing accelerator.

Accordingly, the embodiments provide an adhesive composition that has a long pot life to obtain excellent workability and that exhibits practical adhesive performance within a short aging time of 0.5 days after adhesive processing, thereby providing excellent productivity.

The adhesive composition may be effective in bonding various adherends, and an adhesive layer prepared from the adhesive composition may be suitably used as an adhesive layer for optical members, surface protective films, and adhesive sheets.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition, comprising:

100 parts by weight of a (meth)acrylic copolymer having a weight average molecular weight of about 150,000 to about 950,000 g/mol;

about 0.05 to about 5 parts by weight of a carbodiimide crosslinker, based on 100 parts by weight of the (meth)acrylic copolymer; and about 0.001 to about 5 parts by weight of an imidazole compound represented by Formula 1, based on 100 parts by weight of the (meth)acrylic copolymer:

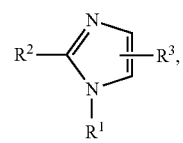

[Formula 1]

wherein:

in Formula 1, $R^1$, $R^2$, and $R^3$ are each independently a hydrogen atom, a halogen atom, or a substituted or unsubstituted C1 to C10 straight or branched alkyl group, the adhesive composition prepares an adhesive layer for a surface protective film, and the adhesive layer has an adhesive strength of about 0.05 to about 0.3 N/25 mm according to JIS Z0237.

2. The adhesive composition as claimed in claim 1, wherein the (meth)acrylic copolymer is prepared from a monomer mixture including:

about 0 to about 9 parts by weight of a carboxyl group containing monomer, about 0 to about 9 parts by weight of a hydroxyl group containing (meth)acrylic monomer, and about 82 to about 99.9 parts by weight of a (meth)acrylic acid ester monomer, a total amount of the carboxyl group containing monomer and the hydroxyl group containing (meth)acrylic monomer being greater than 0 parts by weight and a total amount of the carboxyl group containing monomer, the hydroxyl group containing (meth)acrylic monomer, and the (meth)acrylic acid ester monomer being 100 parts by weight.

3. An optical member comprising an adhesive layer prepared from an adhesive composition the adhesive composition including:

100 parts by weight of a (meth)acrylic copolymer having a weight average molecular weight of about 100,000 to about 2,000,000 g/mol;

about 0.05 to about 5 parts by weight of a carbodiimide crosslinker, based on 100 parts by weight of the (meth)acrylic copolymer; and about 0.001 to about 5 parts by weight of an imidazole compound represented by Formula 1, based on 100 parts by weight of the (meth)acrylic copolymer:

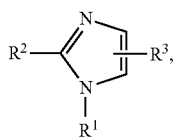

[Formula 1]

wherein, in Formula 1, $R^1$, $R^2$, and $R^3$ are each independently a hydrogen atom, a halogen atom, or a substituted or unsubstituted C1 to C10 straight or branched alkyl group.

4. The optical member as claimed in claim 3, wherein:
the (meth)acrylic copolymer has a weight average molecular weight of about 1,000,000 to about 1,800,000 g/mol, and
the adhesive layer has an adhesive strength of about 0.5 to about 9 N/25 mm according to JIS Z0237.

5. The optical member as claimed in claim 3, wherein the adhesive layer has a gel fraction of about 50 to about 95% after forming the adhesive composition into an adhesive layer and leaving the adhesive layer at about 23° C. and about 50% RH for about 0.5 days.

6. An adhesive composition, comprising:
100 parts by weight of a (meth)acrylic copolymer having a weight average molecular weight of about 100,000 to about 2,000,000 g/mol;
about 0.05 to about 5 parts by weight of a carbodiimide crosslinker, based on 100 parts by weight of the (meth)acrylic copolymer; and
about 0.001 to about 5 parts by weight of an imidazole compound represented by Formula 1, based on 100 parts by weight of the (meth)acrylic copolymer:

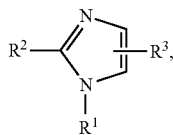

[Formula 1]

wherein, in Formula 1, R', $R^2$, and $R^3$ are each independently a hydrogen atom, a halogen atom, or a substituted or unsubstituted C1 to C10 straight or branched alkyl group, and
wherein the (meth)acrylic copolymer is prepared from a monomer mixture including:
about 0 to about 9 parts by weight of a carboxyl group containing monomer,
greater than 0 to about 9 parts by weight of a hydroxyl group containing (meth)acrylic monomer, and
about 82 to about 99.9 parts by weight of a (meth)acrylic acid ester monomer, a total amount of the carboxyl group containing monomer, the hydroxyl group containing (meth)acrylic monomer, and the (meth)acrylic acid ester monomer being 100 parts by weight.

7. The adhesive composition as claimed in claim 6, further comprising about 0.05 to about 5 parts by weight of an isocyanate crosslinker, based on 100 parts by weight of the (meth)acrylic copolymer.

8. The adhesive composition as claimed in claim 6, further comprising a silane coupling agent.

9. A surface protective film comprising an adhesive layer prepared from the adhesive composition as claimed in claim 6.

10. The surface protective film as claimed in claim 9, wherein:
the (meth)acrylic copolymer has a weight average molecular weight of about 150,000 to about 950,000 g/mol, and
the adhesive layer has an adhesive strength of about 0.05 to about 0.3 N/25 mm according to JIS Z0237.

11. The surface protective film as claimed in claim 9, wherein the adhesive layer has a gel fraction of about 70 to about 100% after forming the adhesive composition into an adhesive layer and leaving the adhesive layer at about 23° C. and about 50% RH for about 0.5 days.

12. An adhesive sheet comprising an adhesive layer prepared from the adhesive composition as claimed in claim 6.

13. The adhesive sheet as claimed in claim 12, wherein:
the (meth)acrylic copolymer has a weight average molecular weight of about 150,000 to about 950,000 g/mol, and
the adhesive layer has an adhesive strength of about 0.05 to about 20 N/25 mm according to JIS Z0237.

14. The adhesive sheet as claimed in claim 12, wherein the adhesive layer has a gel fraction of about 70 to about 100% after forming the adhesive composition into an adhesive layer and leaving the adhesive layer at about 23° C. and about 50% RH for about 0.5 days.

15. The adhesive composition as claimed in claim 6, wherein:
the (meth)acrylic copolymer has a weight average molecular weight of about 1,000,000 to about 1,800,000 g/mol,
the adhesive composition prepares an adhesive layer for an optical member, and
the adhesive layer has an adhesive strength of about 0.5 to about 9 N/25 mm according to JIS Z0237.

16. The adhesive composition as claimed in claim 15, wherein the adhesive layer has a gel fraction of about 50 to about 95% after forming the adhesive composition into an adhesive layer and leaving the adhesive layer at about 23° C. and about 50% RH for about 0.5 days.

17. The adhesive composition as claimed in claim 6, wherein:
the (meth)acrylic copolymer has a weight average molecular weight of about 150,000 to about 950,000 g/mol,
the adhesive composition prepares an adhesive layer for a surface protective film, and the adhesive layer has an adhesive strength of about 0.05 to about 0.3 N/25 mm according to JIS Z0237.

18. The adhesive composition as claimed in claim 17, wherein the adhesive layer has a gel fraction of about 70 to about 100% after forming the adhesive composition into an adhesive layer and leaving the adhesive layer at about 23° C. and about 50% RH for about 0.5 days.

19. The adhesive composition as claimed in claim 6, wherein:
the (meth)acrylic copolymer has a weight average molecular weight of about 150,000 to about 950,000 g/mol,
the adhesive composition prepares an adhesive layer for an adhesive sheet, and
the adhesive layer has an adhesive strength of about 0.05 to about 20 N/25 mm according to JIS Z0237.

20. The adhesive composition as claimed in claim 19, wherein the adhesive layer has a gel fraction of about 70 to about 100% after forming the adhesive composition into an adhesive layer and leaving the adhesive layer at about 23° C. and about 50% RH for about 0.5 days.

* * * * *